US009845556B2

(12) United States Patent
Meure et al.

(10) Patent No.: US 9,845,556 B2
(45) Date of Patent: Dec. 19, 2017

(54) PRINTING PATTERNS ONTO COMPOSITE LAMINATES

(71) Applicant: The Boeing Company, Chicago, IL (US)

(72) Inventors: Samuel J. Meure, Fishermans Bend (AU); Christopher A. Howe, Fishermans Bend (AU)

(73) Assignee: The Boeing Company, Chicago, IL (US)

( * ) Notice: Subject to any disclaimer, the term of this patent is extended or adjusted under 35 U.S.C. 154(b) by 421 days.

(21) Appl. No.: 14/493,364

(22) Filed: Sep. 23, 2014

(65) Prior Publication Data
US 2016/0083871 A1    Mar. 24, 2016

(51) Int. Cl.
| D02G 3/36 | (2006.01) |
| D02G 3/44 | (2006.01) |
| D06M 23/16 | (2006.01) |
| B05D 7/24 | (2006.01) |
| B05D 1/02 | (2006.01) |
| B05D 1/26 | (2006.01) |
| B05D 7/00 | (2006.01) |
| B41M 5/00 | (2006.01) |
| D06H 1/02 | (2006.01) |
| D06P 3/00 | (2006.01) |
| D06P 1/00 | (2006.01) |
| D04H 3/04 | (2012.01) |
| D04H 3/12 | (2006.01) |
| B29C 70/58 | (2006.01) |
| D06P 5/30 | (2006.01) |
| D06M 11/74 | (2006.01) |
| D06M 11/79 | (2006.01) |
| D06M 11/83 | (2006.01) |
| D06P 1/44 | (2006.01) |

(52) U.S. Cl.
CPC ......... D02G 3/36 (2013.01); B05D 1/02 (2013.01); B05D 1/26 (2013.01); B05D 7/00 (2013.01); B05D 7/24 (2013.01); B29C 70/58 (2013.01); B41M 5/0023 (2013.01); B41M 5/0041 (2013.01); B41M 5/0047 (2013.01); D02G 3/447 (2013.01); D04H 3/04 (2013.01); D04H 3/12 (2013.01); D06H 1/02 (2013.01); D06M 11/74 (2013.01); D06M 11/79 (2013.01); D06M 11/83 (2013.01); D06M 23/16 (2013.01); D06P 1/00 (2013.01); D06P 1/44 (2013.01); D06P 3/00 (2013.01); D06P 5/30 (2013.01); B05D 2203/00 (2013.01); B05D 2256/00 (2013.01); D10B 2505/02 (2013.01)

(58) Field of Classification Search
CPC ... B05D 1/02; B05D 1/26; B05D 7/00; B 05D 7/24; B05D 2203/00; B05D 2256/00; D06P 1/00; D06P 3/00; D06H 1/02; B41M 5/0023; B41M 5/0041; B41M 5/0047; D06M 23/16
USPC ........................................................ 427/288
See application file for complete search history.

(56) References Cited

U.S. PATENT DOCUMENTS

| 2,424,743 | A | 7/1947 | Davis et al. |
| 3,943,090 | A | 3/1976 | Enever |
| 4,306,040 | A | 12/1981 | Baer |
| 4,861,803 | A | 8/1989 | Turner |
| 5,028,478 | A | 7/1991 | Odagiri et al. |
| 5,589,523 | A | 12/1996 | Sawaoka |
| 5,605,745 | A | 2/1997 | Recker et al. |
| 5,618,857 | A | 4/1997 | Newberth |
| 6,503,856 | B1 | 1/2003 | Broadway et al. |
| 6,508,897 | B1 | 1/2003 | Yamaguchi |
| 6,740,185 | B2 | 5/2004 | Baldwin |
| 7,037,865 | B1 | 5/2006 | Kimberly |
| 7,122,250 | B2 | 10/2006 | Kinsho et al. |
| 7,435,693 | B2 | 10/2008 | Tsotsis et al. |
| 7,645,402 | B2 | 1/2010 | Choi et al. |
| 7,655,295 | B2 | 2/2010 | Smith et al. |
| 7,738,763 | B2 | 6/2010 | Ouderkirk |
| 7,910,636 | B2 | 3/2011 | Barker |
| 8,080,313 | B2 | 12/2011 | Bonneau et al. |
| 8,283,404 | B2 | 10/2012 | Allen |
| 8,288,453 | B2 | 10/2012 | Hsu et al. |
| 8,519,505 | B2 | 8/2013 | Hiroshige et al. |
| 8,703,630 | B2 | 4/2014 | LoFaro et al. |
| 2002/0117252 | A1 | 8/2002 | Baldwin |
| 2002/0119331 | A1 | 8/2002 | Jiang |
| 2003/0174994 | A1 | 9/2003 | Garito et al. |
| 2005/0070666 | A1 | 3/2005 | Martin |
| 2005/0255236 | A1 | 11/2005 | Deng |

(Continued)

FOREIGN PATENT DOCUMENTS

| CA | 2312467 A1 | 9/1996 |
| CN | 101623266 A | 1/2010 |

(Continued)

OTHER PUBLICATIONS

Extended European Search Report dated Feb. 24, 2016.
(Continued)

Primary Examiner — William Phillip Fletcher, III

(57) ABSTRACT

A composite fiber may include at least one reinforcing filament formed of a first material. A second material maybe systematically deposited in a printed onto the at least one reinforcing filament such that at least one of a length, a width, and a thickness of the second material varies across a surface of the at least one reinforcing filament. The printed pattern may alter one or more properties of a composite structure containing the composite fiber.

7 Claims, 14 Drawing Sheets

(56) References Cited

U.S. PATENT DOCUMENTS

| | | |
|---|---|---|
| 2006/0057355 A1 | 3/2006 | Suzuki et al. |
| 2006/0269738 A1 | 11/2006 | Kimberly |
| 2007/0248827 A1 | 10/2007 | Rukavina |
| 2008/0176987 A1 | 7/2008 | Trevet et al. |
| 2009/0004460 A1 | 1/2009 | Gruber |
| 2009/0130376 A1 | 5/2009 | Berkel et al. |
| 2009/0326137 A1 | 12/2009 | Hsu et al. |
| 2010/0249277 A1 | 9/2010 | Fang |
| 2010/0273382 A1 | 10/2010 | Nandi |
| 2010/0304119 A1 | 12/2010 | Bonneau |
| 2011/0014419 A1 | 1/2011 | Simmons et al. |
| 2011/0021360 A1 | 1/2011 | Al-Ghamdi |
| 2011/0028308 A1 | 2/2011 | Shah et al. |
| 2012/0040148 A1* | 2/2012 | Mozel .................. B41M 5/0011 428/195.1 |
| 2012/0064283 A1 | 3/2012 | Hill et al. |
| 2012/0307304 A1* | 12/2012 | Moreno .................. D06Q 1/12 358/1.15 |
| 2013/0029574 A1 | 1/2013 | Van Der Steen |
| 2013/0098741 A1* | 4/2013 | Veenstra .................. B41J 2/01 200/308 |
| 2013/0167502 A1 | 7/2013 | Wilson et al. |
| 2013/0221285 A1 | 8/2013 | Song et al. |
| 2014/0038481 A1 | 2/2014 | Chen |
| 2014/0076198 A1 | 3/2014 | Kim et al. |
| 2014/0295723 A1 | 10/2014 | Nelson |
| 2015/0252184 A1 | 9/2015 | Arai |
| 2015/0259493 A1 | 9/2015 | Nederkoorn |
| 2016/0300810 A1 | 10/2016 | Kanamori |

FOREIGN PATENT DOCUMENTS

| | | |
|---|---|---|
| CN | 202878879 U | 4/2013 |
| DE | 102012003001 A1 | 8/2013 |
| EP | 0378854 | 7/1990 |
| EP | 1066224 | 12/2001 |
| EP | 1381641 A1 | 1/2004 |
| EP | 2236549 | 10/2010 |
| EP | 2886590 A1 | 6/2015 |
| WO | WO1999021697 | 5/1999 |
| WO | WO2014073960 | 5/2014 |
| WO | WO2014074767 A1 | 5/2014 |
| WO | WO2015097283 | 7/2015 |

OTHER PUBLICATIONS

European Search Report for EP15186490, dated Jan. 22, 2016.

Sober, D.J., "Kaneka Core-Shell Toughening Systems for Thermosetting Resins," 2007.

Suzuki, M.; Nagai, A.; Suzuki, M., Takahashi, A.: "Relationship between Structure and Mechanical Property for Bismaleimide-Biscyanamide resin," 1992. J. App. Poly. Sci, 45, pp. 177-180.

Fan, H.; Lei, Z.; Pan, J.H.; Zhao, X.S., "Sol-gel synthesis, microstructure and adsorption properties of hollow silica spheres," Materials Letters 65 (2011), 1811-1814.

Hydro, et al., Journal of Polymer Science: Part B: Polymer Physics, 45,1470-1481 (2007).

Diaz, Jairo et al. Thermal Expansion of Self-Organized and Shear-Oriented Cellulose Nanocrystal Films, Biomacromolecules, 2013 14(8), pp. 2900-2908. published online Jul. 10, 2013.

Hackett et al., "The Effect of Nanosilica Concentration on the Enhancement of Epoxy Matrix Resins for Prepreg Composites," Society for the Advancement of Material and Process Engineering, 2010.

Nagavarma et al., "Different Techniques for Preparation of Polymeric Nanoparticles—A Review," Asian Journal of Pharmaceutical and Clinical Research, vol. 5, Suppl 3, 2012.

Extended Office Action for Application No. 15186472.5, dated Jul. 18, 2017.

* cited by examiner

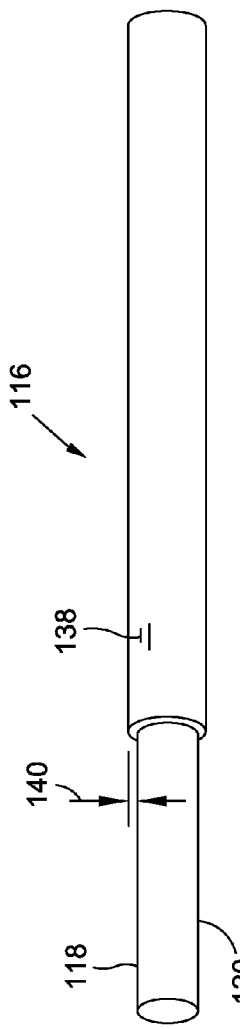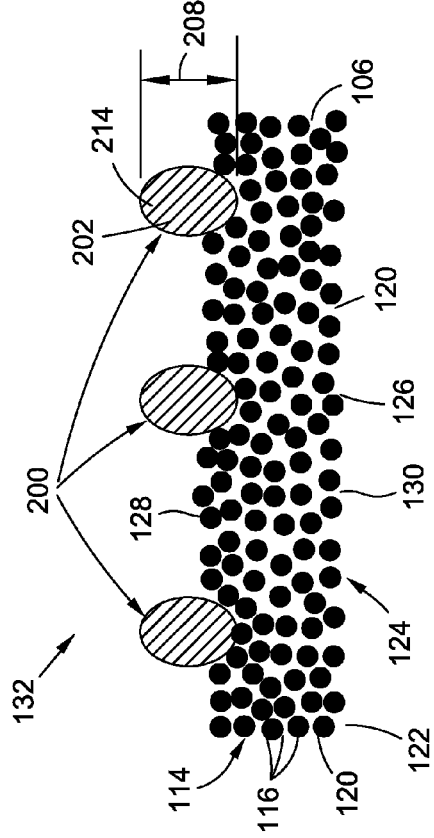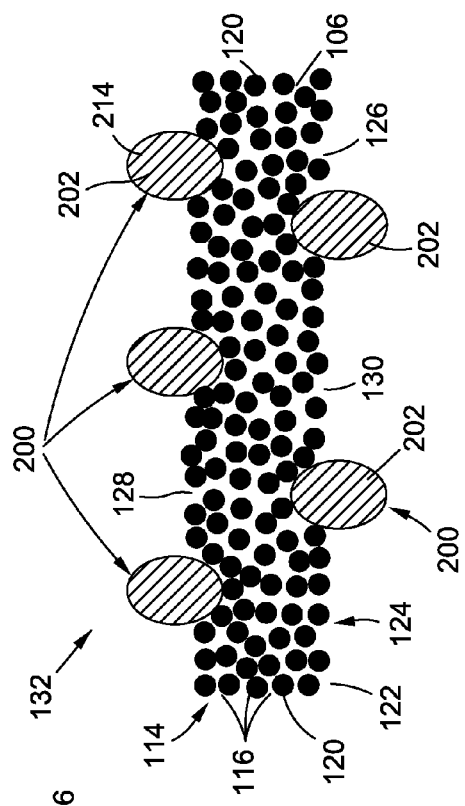

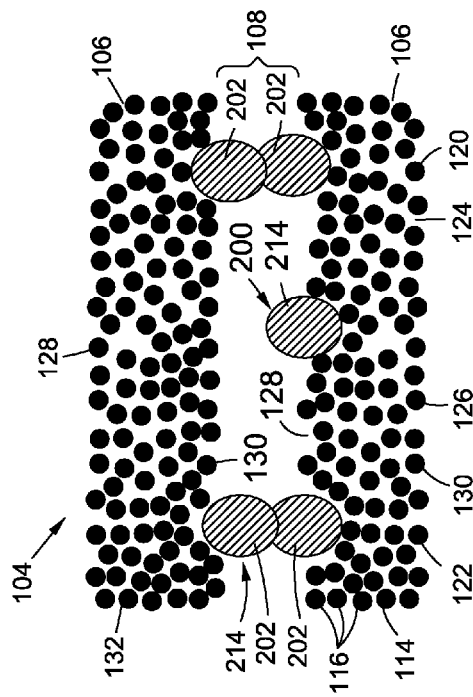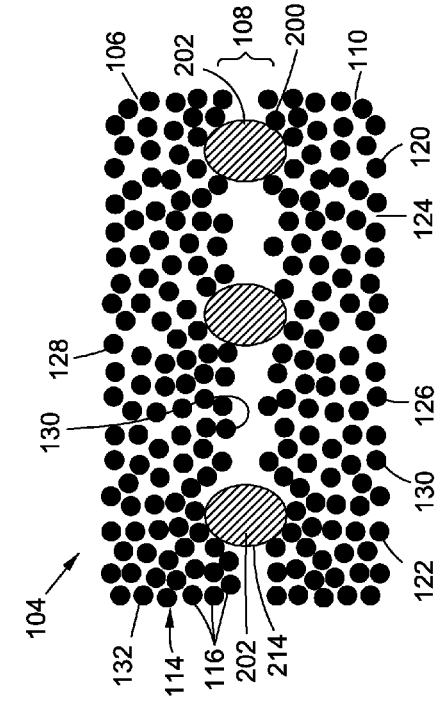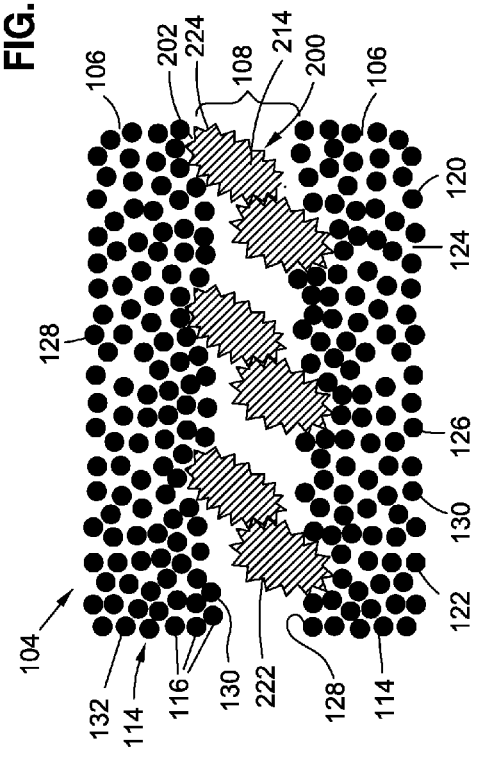

PRINTING PATTERNS ONTO COMPOSITE LAMINATES

FIELD

The present disclosure relates generally to composite structures and, more particularly, to the printing of modifier materials onto composite laminates.

BACKGROUND

Composite structures typically include continuous reinforcing fibers embedded in a resin matrix. A composite laminate is a type of composite structure comprising a layup of composite plies arranged in a stack. The individual composite plies of a composite layup may be pre-impregnated with resin (e.g., prepreg plies) prior to stacking. The stack of prepreg plies may be arranged such that the continuous reinforcing fibers in each ply are oriented in a specific direction. Heat may be applied to the stack to reduce the viscosity of the resin in each ply to allow the resin to intermingle with the resin of adjacent plies while the stack is consolidated under pressure to remove voids and volatiles from within the composite layup. The resin may be cured or solidified into a hardened state and passively or actively cooled resulting in a composite structure. Alternatively, instead of using prepreg plies, the composite plies may be provided as dry fiber preforms arranged in a stack. Liquid resin may be infused into the stack while heat and/or pressure are applied to consolidate and cure the resin after which the layup may be passively or actively cooled to result in a composite structure.

The ability to tailor the direction of the reinforcing fibers in each ply of a composite layup results in a composite structure with significant performance advantages. Such performance advantages include a high specific strength and high specific modulus of elasticity relative to the specific strength and modulus of metallic structures. Unfortunately, conventional composite laminates possess several characteristics that may detract from their performance advantages. For example, conventional composite laminates may be susceptible to separation at the resin-fiber interface due to the absence of crack-arresting features within the composite laminate. In addition, a conventional composite assembly may have relatively low mode II interlaminar shear strength or peel strength at the interface between co-bonded or co-cured composite laminates that make up the composite assembly.

A conventional composite laminate may also possess relatively low electrical conductivity which may present challenges in transporting and distributing electrical current through a composite structure such as in the event of a lightning strike. In addition, composite laminates that interface with metallic components may be susceptible to corrosion as a result of oxidation or reduction reactions that may occur between the composite laminate and metallic material. Furthermore, conventional dry fiber composite plies may lack sufficient tack to enable the dry fiber plies to stick together to allow for controlled stacking of the dry fiber plies into a preform.

Attempts to resolve the issue of separation at the resin-fiber interface of conventional composite laminates include randomly distributing thermoplastic material in bulk throughout a composite layup. Although the random distribution of thermoplastic material may improve the mode II interlaminar strength, the lack of control at the resin-fiber interface in conventional composite laminates results in low mode I interlaminar strength which may present challenges in preventing crack propagation within fiber tows. Attempts to address low mode II interlaminar shear strength at the interface between composite laminates of a conventional composite assembly include the addition of tougheners in the resin. Unfortunately, resin tougheners may have a relatively high molecular weight that may undesirably increase the viscosity of the resin which may inhibit resin flow during infusion of fiber preforms. Attempts to address the issue of low electrical conductivity in conventional composite laminates include the addition of metallic meshes or foils across the surface of composite plies. Unfortunately, the addition of separate metallic meshes or foils increases the cost, complexity, and production time of a composite structure.

Attempts to prevent corrosion at the interface between a composite laminate and a metallic part include adding a separate layer of fiberglass at the interface to act as a barrier ply against corrosion. Unfortunately, the addition of fiberglass increases the cost and complexity of manufacturing a composite laminate. The problem of low tack in conventional dry fiber composite plies has been addressed by adding epoxy binders or nylons in the resin, or by using soldering irons to locally heat and tack composite plies together. Unfortunately, epoxy binders or nylons have finite properties that limit the range of temperatures and pressures required to form a ply stack of dry fiber preforms. The local tacking together of composite plies using soldering irons is a time-consuming process that adds to the production time of a composite structure.

As can be seen, there exists a need in the art for a composite laminate and manufacturing method that provides performance improvements such as improved crack-resistance, improved interlaminar shear strength, increased electrical conductivity and corrosion resistance, and improved tack in a broad range of temperatures.

SUMMARY

The above-noted needs associated with composite laminates are specifically addressed by the present disclosure which provides a composite fiber that may include at least one reinforcing filament formed of a first material. A second material may be systematically deposited in a printed pattern onto the reinforcing filament such that a length, a width, and/or a thickness of the second material varies across a surface of the reinforcing filament. The printed pattern may have the effect of altering one or more properties of a composite structure containing the composite fiber.

In a further embodiment, disclosed is a composite structure which may include a resin and a plurality of reinforcing filaments embedded in the resin. The reinforcing filaments may be formed of a first material. The composite structure may include a second material which may be systematically deposited onto the reinforcing filaments such that a length, a width, and/or a thickness of the second material varies across the surface of the reinforcing filaments.

Also disclosed is a method of producing a composite fiber. The method may include providing a plurality of reinforcing filaments formed of a first material. The method may additionally include printing a second material onto the plurality of reinforcing filaments using a deposition head of a printer or printing device.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 7 is a perspective view of a portion of a length of a reinforcing filament of a fiber tow and illustrating a sizing (e.g., a surface coating) that may be optionally included with the reinforcing filament;

FIG. 8 is a cross-sectional view of a unidirectional tape taken along line 8 of FIG. 3 and showing an example of the distribution of a second material printed onto a top surface of the unidirectional tape;

FIG. 9 is a cross-sectional view of a unidirectional tape showing an example of the distribution of a second material printed onto the top surface and the bottom surface of the unidirectional tape;

FIG. 10 is a cross-sectional view of a unidirectional tape showing an example of a second material of a printed pattern directly contacting both of the adjacent composite plies of a composite structure;

FIG. 11 is a cross-sectional view of the composite layup illustrating a pair of adjacent composite plies of unidirectional tape having the same fiber orientation and showing an example of contact between the printed pattern of second material on each one of the composite plies;

FIG. 12 is a cross-sectional view of a unidirectional tape of adjacent composite plies and showing a printed pattern of second material directly contacting on one composite ply and mechanically engaging the printed pattern of second material on an adjacent composite ply;

DETAILED DESCRIPTION

Figure 1:
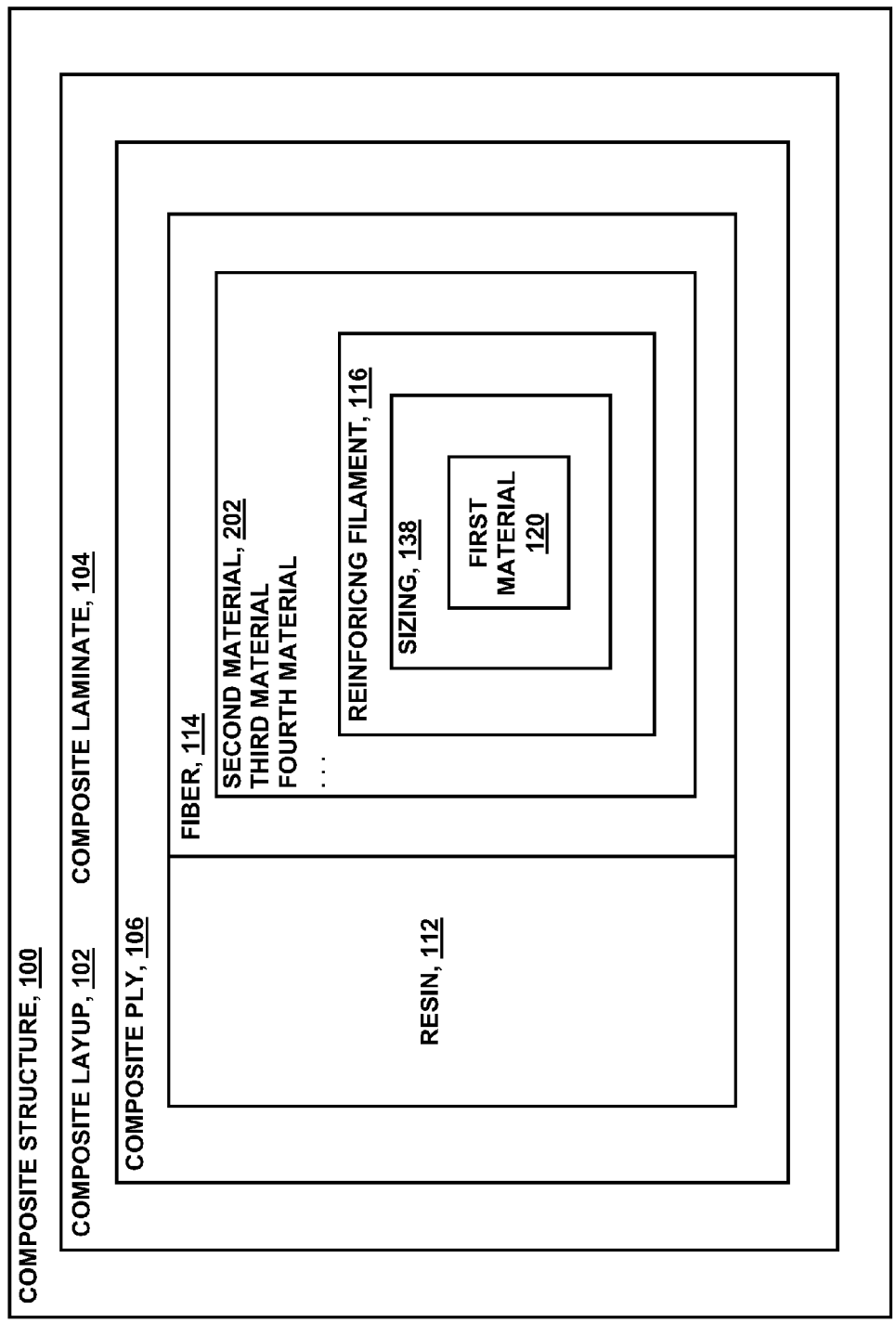
FIG. 1 is a block diagram of a composite structure incorporating one or more materials printed onto the reinforcing fibers formed of a first material and which may be configured as fiber tows, unidirectional tape, and/or woven fabric.

Referring now to the drawings wherein the showings are for purposes of illustrating various embodiments of the disclosure, shown in FIG. 1 is a block diagram of a composite structure 100. The composite structure 100 may be formed as a composite layup 102 or composite laminate 104 including a plurality of composite plies 106. The composite plies 106 may include reinforcing fibers 114 embedded within resin 112. The reinforcing fibers 114 may be made up of a plurality of reinforcing filaments 116. In some examples, the reinforcing filaments 116 may include a sizing 138 (see, e.g., FIG. 7) or protective coating which may be applied to the filament surface 118 of the reinforcing filaments 116 during manufacturing of the reinforcing filaments 116. The sizing 138 may be a surface finish that may be deposited in a uniform or non-uniform sizing thickness 140 (FIG. 7) onto the reinforcing surface along the length of the reinforcing filament 116. The sizing 138 may improve the adhesion between the reinforcing filaments 116 and the resin 112 and/or may protect the reinforcing filaments 116 from breakage during processing such as during weaving and/or prepregging operations. The reinforcing filaments 116 may be formed of a first material 120 such as carbon material or non-carbon material.

Advantageously, in the present disclosure, one or more modifier materials (e.g., a second material, a third material, a fourth material, etc.) may be applied to one or more reinforcing filaments 116, fiber tows 114, unidirectional tapes 132 (FIG. 2), unidirectional sheet, woven fabric 134 (FIG. 16), braided fabric, non-crimp fabrics, composite plies or preforms, or any one of a variety of other fiber forms, as a means to alter the properties of the composite structure 100. The modifier material or second material 202 (FIG. 4) or any number of other materials (a second material, a third material, a fourth material, etc.) may be systematically deposited in a predetermined printed pattern 200 along a length or width of a reinforcing filament, fiber tow 114, unidirectional tape 132, unidirectional sheet, woven fabric 134, composite ply 106, or other fiber form such that at least one of a length 204, a width 206, and a thickness 208 of the second material 202 varies across a surface of the reinforcing filament, fiber tow 114, unidirectional tape 132, unidirectional sheet, woven fabric 134, or other fiber form.

In some examples, the second material 202 may be applied to fiber forms (e.g., tows, tape, fabric) containing reinforcing filaments 116 (FIG. 2) that lack sizing 138. In other examples, the second material 202 may be applied over the sizing 138 of the reinforcing filaments 116, fiber tows 114, tape, woven fabric 134 (FIG. 16), or other fiber forms. The printed modifier material or second material 202 may be different than the first material 120 of the reinforcing filaments 116. The second material 202 (e.g., the modifier material) may be systematically deposited (e.g., three-dimensionally printed) in a precisely-controlled printed pattern 200 along a length and/or width of one or more reinforcing filaments 116, fiber tows 114 (FIG. 2), unidirectional tape 132, woven fabric 134, or other fiber forms of a composite layup 102 to alter the properties of a composite structure 100. The second material 202 may be printed as print media 264 (FIG. 14A) in the form of inks, granules, particulates 266, filament strands 268, and extrusion media.

The second material 202 may be applicable to or printed by other manufacturing techniques including, but not limited to, hand application/printing, spray coating, fused deposition molding, lithography, stereolithography, flexography, dry transfer, laser sintering, selective heat sintering, plaster-based 3D printing, layer-by-layer deposition, inkjet printing, chemical/thermal binding and extrusion to position. The second material 202 (FIG. 4) may include one or more of organic monomers, prepolymers, polymers, metallic powders, inorganic fillers, and an aqueous or solvent-based solution. The second material 202 may also include fillers or secondary phases such as nano-silica, block copolymers, graphene platelets, carbon nanotubes, and other types of material. Advantageously, the printed pattern 200 may be provided in a hierarchical structure within the composite laminate 104 (FIG. 2) to achieve specific functionality or performance improvements in the composite structure 100.

In one example, a second material 202 may contain polymer nanoparticles (not shown) that provide at least one of increased toughness, increased flammability resistance, increased electrical conductivity, reduced cure-shrinkage-related distortion, reduced heat-of-reaction-related distortion, and/or reduced heat-of-reaction-related resin degradation. The polymer nanoparticles may be made from the same materials as the resin or at least one of thermoplastic material, acrylics, fluorocarbons, polyamides, polyolefins, polyesters, polycarbonates, polyurethanes, polyaryletherketones, polyetherimides, thermosetting material, polyurethanes, phenolics, polyimides, sulphonated polymer (polyphenylene sulphide), a conductive polymer (e.g., polyaniline), benzoxazines, bismaleimides, cyanate esthers, polyesters, epoxies, and silsesquioxanes. The polymer nanoparticles may also have at least one of the following properties: be at least partially soluble, have a core-sheath configuration, have a nanoparticle cure shrinkage less than the resin cure shrinkage, a nanoparticle CTE different than the resin CTE, a nanoparticle heat of reaction lower than the resin heat of reaction, a greater distortion capability than the resin, release either a catalyst or a hardener during a resin curing process, and the catalyst or hardener may alter a reaction rate of the resin 112.

Any number of modifier materials (e.g., a second material 202, a third material 212, a fourth material. etc.) may be printed onto any one of a variety of the above-mentioned fiber forms (e.g., filaments, fiber tows, tape, and/or woven fabric, etc.) in a highly-controlled manner. For example, a second material 202 (FIG. 4) may be printed on the nano-scale to meso-scale (e.g., $10^{-9}$ mm to $10^{-3}$ mm) onto one or more fibers 114 forms as a precisely-defined structural and/or functional modifier or additive for a fiber-reinforced composite laminate structure. Printing of the second material 202 allows for a relatively high degree of positional accuracy and hierarchical control of the print media 264 (e.g., the second material 202). In some examples, the second material 202 may be printed such that the length 204, the width 206 (FIG. 4), and/or the thickness 208 of the second material 202 is within the range of approximately 0.01 to 100 microns. Advantageously, the length 204, the width 206, and the thickness 208 of the second material 202 may be controlled in a highly precise manner to provide the desired functionality improvements to specific locations of a composite structure 100 (FIG. 1). For example, the deposition (e.g., the printing) of the second material 202 may improve the crack-resistance, interlaminar shear strength, electrical conductivity, and/or corrosion resistance of a composite structure, and/or the second material 202 may increase the tack of the composite plies 106 in a composite layup 102, as described in greater detail below.

Figure 2:
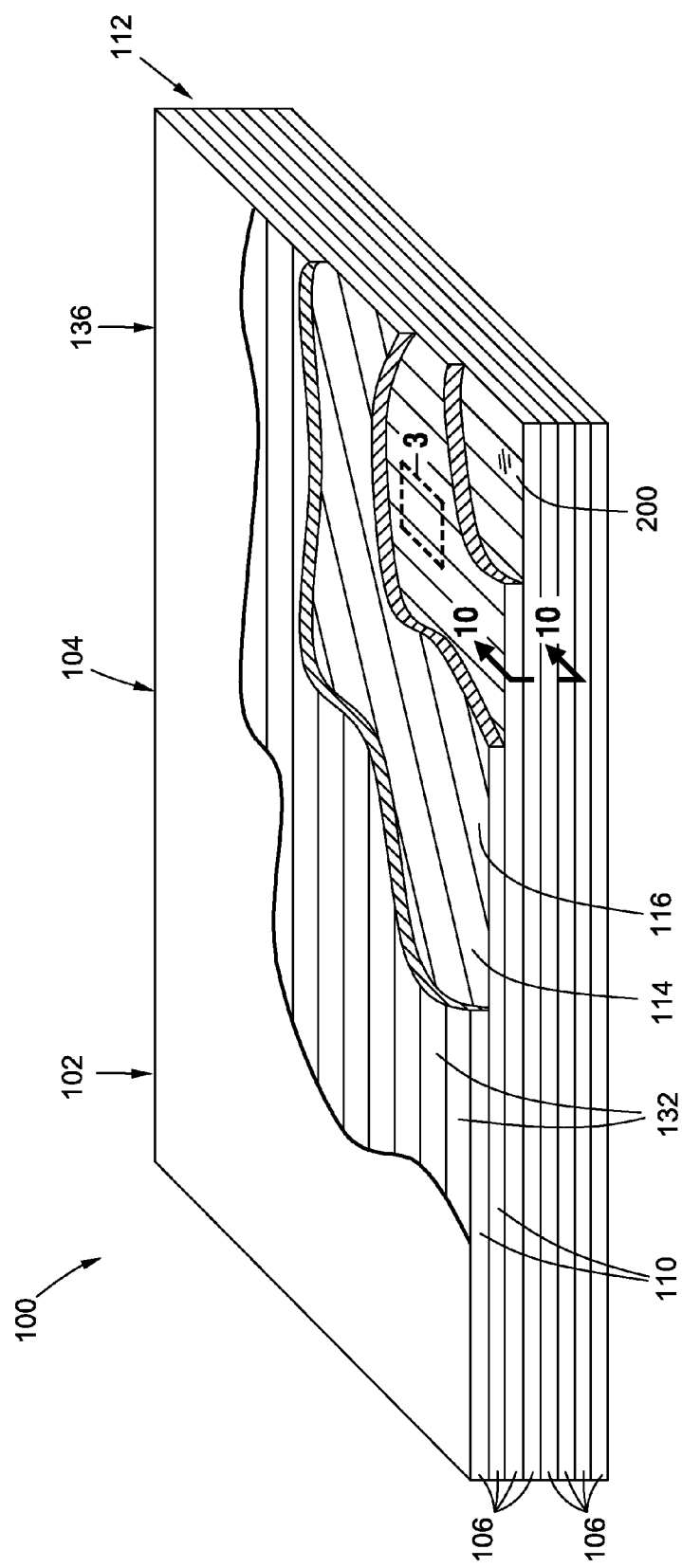
FIG. 2 is a perspective view of a composite layup including a stack of unidirectional plies upon which one or more materials may be printed to improve the properties of the composite structure.

FIG. 2 shows an example of a composite structure 100 formed as a laminated stack of unidirectional plies 110. Each one of the unidirectional plies 110 may include a plurality of parallel fiber tows 114 laid side-by-side. In the example shown, the fibers 114 in one composite ply 106 may be oriented non-parallel to the fibers 114 in an adjacent composite ply 106 (e.g., above or below) in the stack. However, one or more of the composite plies 106 may include fibers 114 that are oriented parallel to the fibers 114 in an adjacent composite ply 106. As indicated above, the reinforcing filaments 116 or fibers 114 may be formed of a first material 120. In one example, the first material 120 (FIG. 1) may be carbon or graphite. However, in other examples, the reinforcing filaments 116 or fibers 114 may be formed of non-carbon material. For example, the fibers 114 may be formed of boron, glass, ceramic, metallic material, and/or any other type of fiber material.

The fibers 114 in each one of the unidirectional plies 110 may be provided as parallel fibers 114 of unidirectional tape 132 or unidirectional sheet (not shown). Each one of the composite plies 106 (FIG. 2) may include a plurality of continuous fiber tows 114. A single fiber tow 114 may include a bundle of several thousand reinforcing filaments 116 (e.g., 1000 to 100,000 or more reinforcing filaments) bundled together. In some examples, a reinforcing filament may have a filament cross-sectional width or diameter of 5-30 microns. For example, a carbon reinforcing filament may have a filament cross-sectional width of approximately 5-7 microns. Glass reinforcing filaments may have a filament cross-sectional width of 10-25 microns. Although not shown, composite fibers 114 in the present disclosure may also encompass chopped fibers 114 as may be incorporated into a fiber mat. In this regard, composite fibers 114 of the present disclosure may also be provided in any one of a variety of other fiber configurations, and are not limited to the fiber configurations disclosed herein. In the present disclosure, the terms reinforcing filament, fiber, fiber tow, and composite fiber may be used interchangeably.

In some examples, a composite structure 100 may be formed of composite plies 106 that may be pre-impregnated with resin 112 (e.g., prepreg composite plies) which may be formed of prepreg fiber tows 114 (FIG. 2), prepreg unidirectional tape 132, and other forms of prepreg. Alternatively, a composite structure 100 may be formed as a dry fiber preform 136. For example, a composite structure 100 (FIG. 2) may be formed by laying up dry composite plies 106, fiber tows 114, dry unidirectional tape 132 (FIG. 4), dry fiber sheets, dry woven cloth, fabric, and/or other forms of dry fiber. The dry fiber forms may be arranged in a stack of composite plies 106 onto which the second material 202 may be printed after which resin 112 may be infused in a wet layup process.

In any one of the examples disclosed herein, the resin 112 and/or the reinforcing filaments 116 may be formed from thermoplastic material or thermosetting material. Thermoplastic material may include at least one of the following: acrylics, fluorocarbons, polyamides, polyethylenes, polyesters, polypropylenes, polycarbonates, polyurethanes, polyarylether ketones, polyetheretherketone, polyetherketoneketone, and polyetherimides. Thermoset material may include one of the following: polyurethanes, phenolics, polyimides, bismaleimides, polyesters, epoxies, cyanate esters, polysolfones, and silsesquioxanes. In addition, in any one of the examples disclosed herein, the resin 112 (FIG. 2) and/or the reinforcing filaments 116 or fibers 114 (FIG. 2) may be formed from materials such as carbons, silicon carbide, and boron. The reinforcing filaments 116 or fibers 114 may also be formed from glass such as E-glass (alumino-borosilicate glass), S-glass (alumino silicate glass), pure silica, borosilicate glass, optical glass, and other glass compositions.

Figure 3:
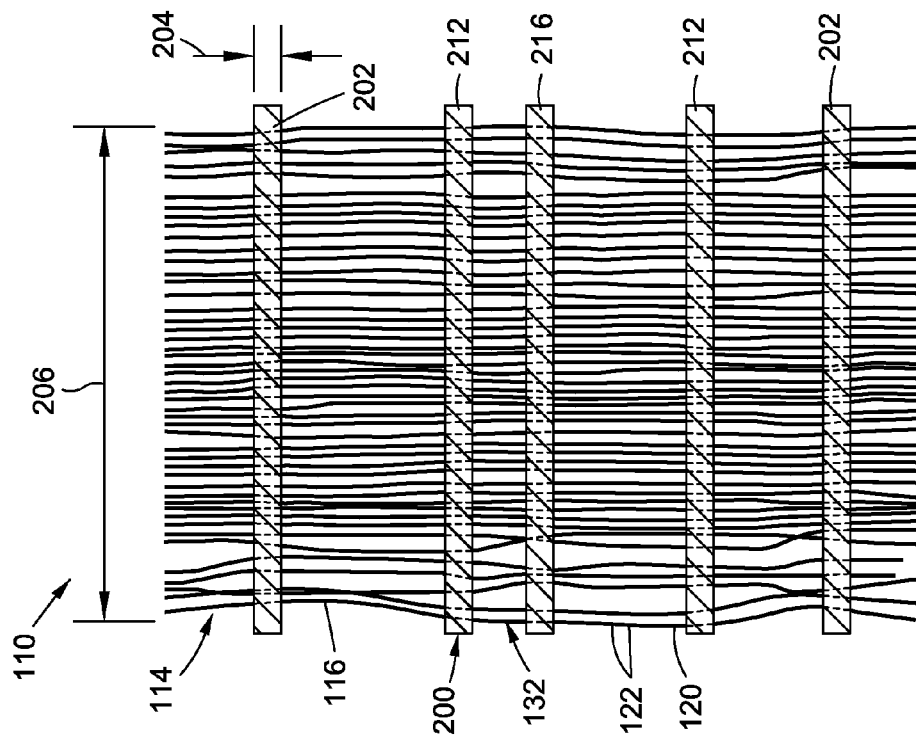
FIG. 3 is a top view of a portion of a length of a unidirectional tape taken along line 3 of FIG. 2 and illustrating a printed pattern of a second material (and/or a third material, a fourth material, etc.) printed onto the unidirectional tape in the form of an array of dots to improve the tack of the unidirectional ply.

FIG. 3 is a top view of a portion of a length of a fiber tow 114 or unidirectional tape 132 having a printed pattern 200 in the form of an array of dots 214 printed onto the fiber tow 114 or unidirectional tape 132. As indicated above, the fiber tow 114 or unidirectional tape 132 may be comprised of a bundle 122 of continuous reinforcing filaments 116. The reinforcing filaments 116 may or may not include sizing 138 (see, e.g., FIG. 7) covering the reinforcing filaments 116. The fiber tows 114 or unidirectional tape 132 may be provided as dry fibers 114 or the fiber tows 114 or unidirectional tape 132 may be provided as prepreg. The array of dots 214 may be formed of one or more modifier materials that may be different than the first material 120 from which the reinforcing filaments 116 are formed. For example, the array of dots 214 may be formed of a second material 202 which may be different than the first material 120. Some of the dots 214 in an array of dots may be formed of a third material 212 which may be a different composition than the first material 120 and/or the second material 202. The third material 212 may be printed in the same or different size (e.g., length, width, thickness) and in the same or different printed pattern than the second material 202. A fourth material (not shown), a fifth material (not shown), or any number of other materials may be printed to provide different functionality. For example, such additional functionalities that may be provided by the different materials may include, but are not limited to, improved crack resistance, improved interlaminar shear strength, increased electrical conductivity and corrosion resistance, and improved tack in a broad range of temperatures. It should be noted that any one of the second, third, fourth, and/or fifth or more materials may provide any one of the above-noted functionalities. In this regard, any number of materials may be combined in any number of ways to provide any one or more of the above-noted functionalities.

The array of dots 214 or any one of a variety of other geometric configurations of one or more modifier materials may be arranged in a printed pattern 200 (FIG. 3) to provide one or more of a variety of different functionalities. For example, a printed pattern 200 may be configured to provide improved tack to the composite plies 106. One or more modifier materials may be provided in a printed pattern 200 that may provide chemical bonding between adjacent composite plies 106 (FIG. 2) and/or mechanical and/or physical interlocking between adjacent composite plies 106. For example, a modifier material may be printed on a fiber form (e.g., a fiber tow, unidirectional tape, woven fabric) and may bond with the reinforcing filaments 116 as the modifier material is applied or printed onto the fiber form by a printer 260 (FIG. 14). The modifier material may have a tackiness that allows the modifier material to stick to an adjacent composite ply 106. In some examples, modifier materials may be printed with mechanical features formed on the printed pattern 200 such as teeth 224 (not shown) or notches that may be engageable to the reinforcing filaments 116 (FIG. 3) of an adjacent composite ply 106. In a further embodiment, a printed pattern 200 on one composite ply 106 may be printed with mechanical features for engaging the printed pattern 200 of an adjacent composite ply 106, as described below.

Furthermore, modifier materials may be selected to be compatible with the processing temperatures of the composite layup 102. For example, modifier materials may be selected to provide tack between composite plies 106 (FIG. 2) within a range of temperatures from room temperature to elevated temperatures associated with consolidation and curing of the resin 112 (FIG. 2). The improved tack may enable dry fiber composite plies or prepreg plies to stick together to allow for controlled handling and stacking of the composite fiber plies into a composite layup 102 (FIG. 2). In this regard, the improved tack provided by the printed pattern 200 may stabilize the composite plies 106 against relative movement during stacking, vacuum bagging, resin infusion, consolidation, and other composite processing operations.

Any one or more of a variety of printed patterns 200 may also provide functionally in the form of improved ply bridging between adjacent plies in a composite laminate 104 (FIG. 10). For example, a printed pattern 200 (FIG. 10) of one or more modifier materials may provide crack prevention or crack-arresting features in the composite structure 100. For example, one or more modifier materials may improve the adhesive bond between the reinforcing filaments 116 and the resin 112 (FIG. 10). In addition, a printed pattern 200 of one or more modifier materials may act as a toughening mechanism which may inhibit or prevent crack initiation or crack growth within the composite structure 100. One or more modifier materials may be printed onto the fiber tows 114 or unidirectional tape 132 in a precisely controlled length 204, width 206, and/or thickness 208 to bridge across the interlaminar region 108 (see e.g., FIGS. 10-13) between an adjacent pair of composite plies 106 as described in greater detail below. The bridging of adjacent composite plies 106 may distribute localized stress concentrations within the composite laminate 104 and thereby minimize and prevent crack initiation or crack growth within the composite laminate 104.

In some examples, the printing of a modifier material in the form of an array of dots 214 or other geometric configuration may improve the toughness of a composite laminate 104. For example, a printed pattern 200 (FIG. 3) of modifier material may induce a controlled pullout, release, or detachment of modifier material particles from reinforcing filaments 116 (FIG. 3) as a stress release mechanism to inhibit or prevent crack formation and/or crack growth. In another example, a modifier material may have a composition or mechanical properties that allow for a controlled amount of deformation of the modifier material when the composite laminate 104 (FIG. 2) is subjected to certain types of loads (e.g., loads of a certain magnitude and/or direction).

In the present disclosure, a second material 202, a third material 212, and/or any number of other modifier materials may be systematically printed onto a fiber form (e.g., fiber tows, unidirectional tape, woven fabric, etc.) using a deposition head 262 (e.g., see FIGS. 14-17) of a printer 260 such as a three-dimensional ink jet printer or other printer configuration. The process of applying one or more modifier materials onto a fiber form may take advantage of the precision in size (e.g., length, width, thickness) and position with which the printer deposition head 262 may print pixels 210 (FIG. 14C) of modifier material in an additive process to form a predetermined printed pattern 200 on a fiber form.

A deposition head 262 of a printer 260 may be configured to print the materials (e.g., the second material 202, third material 212, etc.) in pixels 210 (FIG. 14C) of up to 100 microns in diameter and at a thickness of up to 100 microns. In some examples, the size of each pixel 210 may be between approximately 0.1 to 10 microns in diameter. In other examples, each one of pixels 210 may be applied to a fiber tow, tape, or fabric in a thickness of the each pixel of at least approximately 0.01 microns. A succession of pixels 210 may be printed using a printer 260 deposition head 262 (FIG. 14C) to build up a printed pattern 200 onto a fiber tow 114 or other fiber form such that the final printed pattern 200 (FIG. 13) has a precisely-controlled length 204, width 206, and thickness 208.

Figure 4:
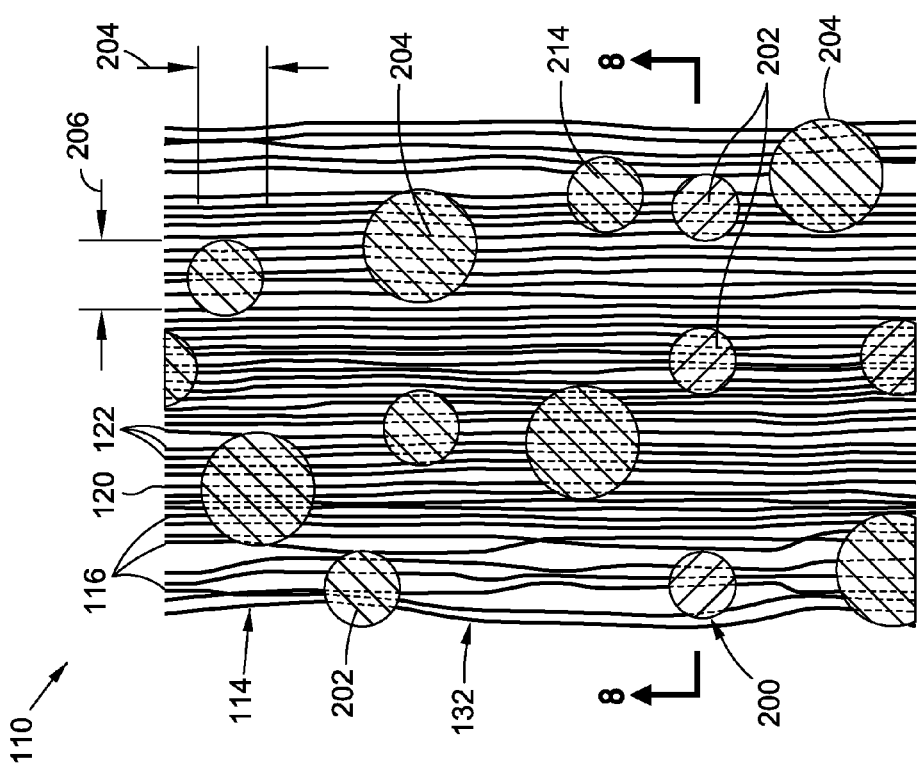
FIG. 4 is a top view of a portion of a length of a unidirectional tape showing an example of a second material printed onto the unidirectional tape in the form of perpendicular lines oriented transverse to a lengthwise direction of the unidirectional tape and facilitating anisotropic conductivity in the composite structure and/or to facilitating crack termination in the composite structure.

FIG. 4 shows a length of a unidirectional tape 132 having a second material 202 printed in a printed pattern 200 of perpendicular lines 216 oriented transverse to a lengthwise direction of the unidirectional tape 132. The printed pattern 200 of perpendicular lines 216 may facilitate anisotropic electrical conductivity along a direction parallel to the perpendicular lines 216 of the printed pattern 200. The arrangement of perpendicular lines 216 may facilitate the transportation and/or distribution of electrical charge through a composite structure 100 such as in the event of a lightning strike on an aircraft. The printed pattern 200 of perpendicular lines 216 may also facilitate crack termination or prevent crack propagation in the composite structure 100. For example, the perpendicular lines 216 may prevent propagation of cracks that may form in the resin 112 between reinforcing filaments 116 when a load is applied perpendicular to the lengthwise direction (e.g., the load-carrying direction) of the reinforcing filaments 116.

Figure 5:
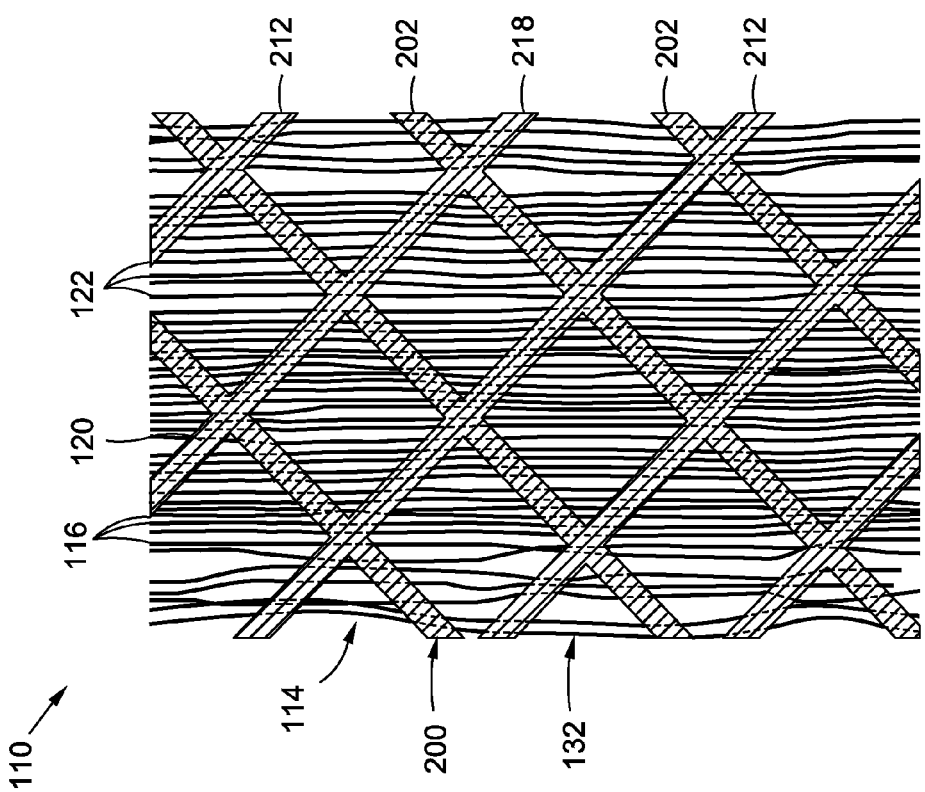
FIG. 5 is a top view of a portion of a length of a unidirectional tape showing an example of a second material printed onto the unidirectional tape in the form of crosshatch patterns to facilitate crack arresting in the composite structure.

FIG. 5 shows a length of a fiber tow 114 with a printed pattern 200 in the form of cross-hatch patterns 218 along the length of the fiber tow 114. Similar to the perpendicular lines 216 shown in FIG. 4, a cross-hatch pattern 218 may also facilitate crack termination or prevent crack propagation that may form and the resin 112 (FIG. 2) of a composite structure 100. The cross-hatch patterns 218 may also provide a pathway to assist in distributing electrical charge through a composite structure 100. One or more of cross-hatch patterns 218 may be printed using one or more of the modifier materials. For example, a cross-hatch pattern 218 may be formed of a second material 202 and a third material 212 which may be different than the first material 120 from which the reinforcing filaments 116 may be formed. The second material 202 may provide one type of functionality such as providing a toughening mechanism to prevent crack initiation or crack growth in the composite structure 100 (FIG. 2) during thermal cycling and/or during certain loading conditions on the composite structure 100. The third material 212 may provide another type of functionality to the composite structure 100 such as improving the electrical conductivity of the composite structure 100.

Figure 6:
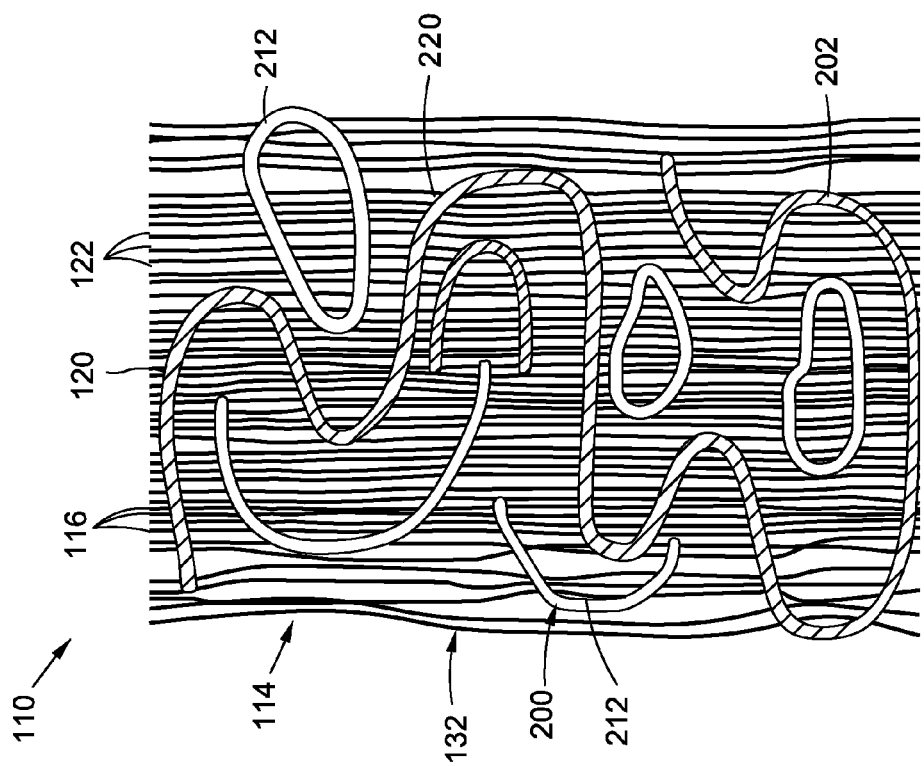
FIG. 6 is a top view of a portion of a length of a unidirectional tape showing an example of a second material (and/or a third material, a fourth, material, etc.) printed onto the unidirectional tape in the form of a combination of curves.

FIG. 6 shows a length of a unidirectional tape 132 with a printed pattern 200 in the form of a combination of curves 220. The curves 220 may be formed of one or more modifier materials as indicated above. In this regard, the printed pattern 200 may vary in length and width to include a combination of a variety of sizes, shapes and configurations. For example, a printed pattern 200 may include any combination of dots 214, lines 216 (FIG. 4), cross-hatches 218 (FIG. 5), and/or curves 220, or any one of a variety of other printed pattern 200 configurations.

Figure 16:
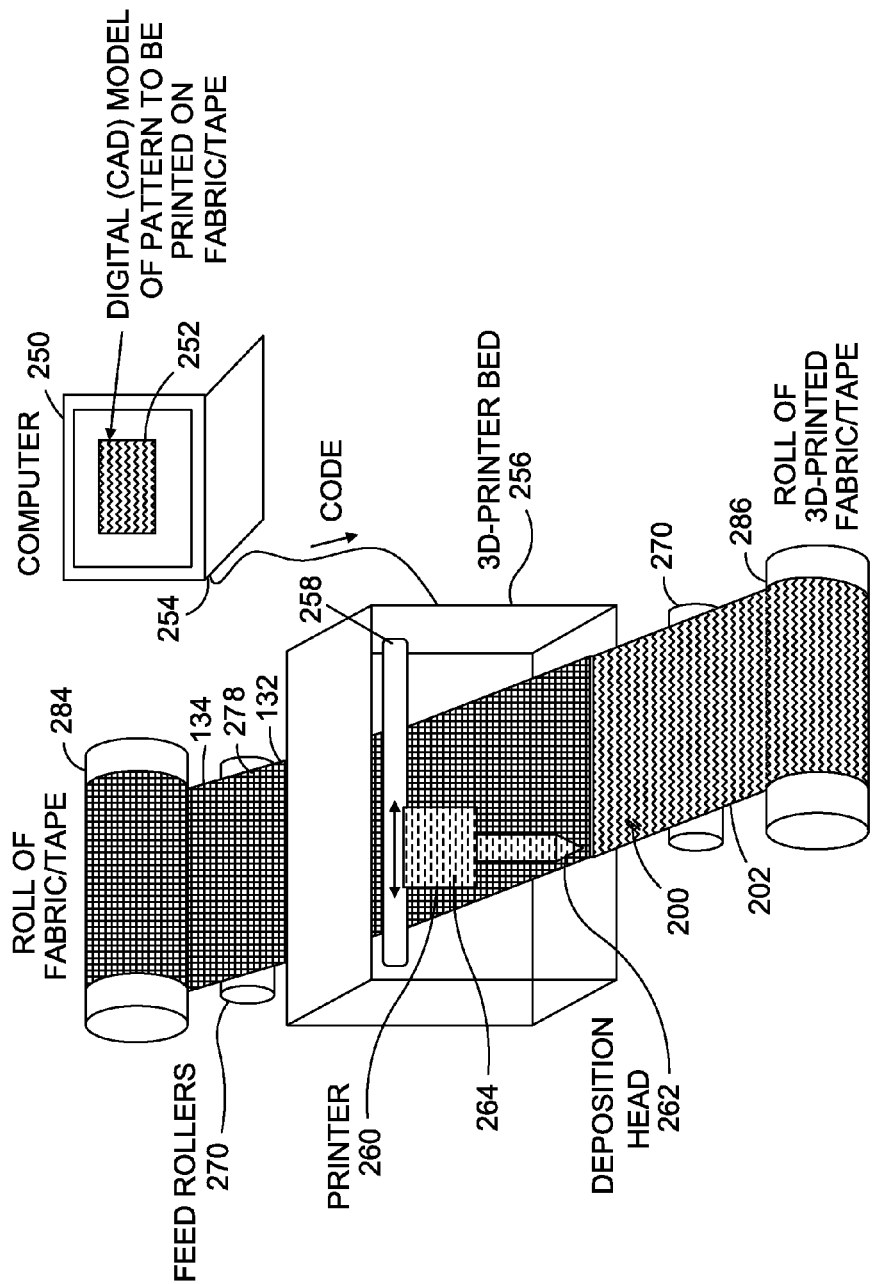
FIG. 16 is a schematic illustration of an example of a system for printing a printed pattern of second material onto a woven fabric or unidirectional tape.

In any example disclosed herein, any one or more modifier materials (e.g., a second material 202, a third material 212, etc.) may be printed onto a fiber form (e.g., reinforcing filaments, fiber tows, unidirectional tape, woven fabric, etc.) in any one of a variety of different printed patterns 200. A modifier material such as a second material 202 may be systematically deposited such that at least one of a length 204, a width 206 (FIG. 3), and a thickness 208 (FIG. 8) of the second material 202 varies across a surface of one or more filaments or one or more fibers 114. For example, a second material 202 may be systematically deposited in a printed pattern 200 along any portion of a length of a fiber tow 114, unidirectional tape 132, or woven fabric 134 (FIG. 16). In some examples, a printed pattern 200 may be repeated along a portion of a length of a fiber tow 114, unidirectional tape 132 (FIG. 5), or woven fabric 134. In other examples, a printed pattern 200 may be printed in a random spacing along the length of a fiber tow 114, unidirectional tape 132, or woven fabric 134.

As may be appreciated, any one or more of a variety of different modifier materials may be incorporated into the printed pattern 200 (FIG. 6) to provide one or more desired functionalities for the composite structure 100 (FIG. 2). In this regard, the systematic deposition of the modifier material onto a fiber form of a composite laminate may result in a composite structure 100 that has at least one composite structure property that is altered relative to the properties of a composite structure having reinforcing filaments that are devoid of the modifier material. The altered composite structure property may include toughness, volume fraction, permeability, modulus, cure shrinkage, heat of reaction, filament tack, flammability, and electrical conductivity, and other types of functionalities. In some examples, a third material 212 may be systematically deposited onto one or more reinforcing filaments 116 or other fiber forms using a deposition head 262 (FIG. 14A) of a printer 260. The result of depositing a second material 202 and a third material 212 may be a composite structure 100 that has at least two (2) different composite structure properties that are altered relative to the properties of a composite structure having reinforcing filaments that are devoid of the second and third material.

In an embodiment, one or more modifier materials may be applied or printed onto a fiber form in one or more printed patterns 200 (FIG. 6) to improve the interlaminar shear strength and/or peel strength of the composite structure 100 (FIG. 2) at the interfaces between mating composite components (not shown). For example, a modifier material may be applied to a fiber form in a printed pattern 200 to improve the interlaminar shear strength and/or peel strength at an interface between a composite skin and a composite stiffener of a resin-infused laminate structure. In another example, one or more modifier materials may be printed onto one or more of the fiber tows 114, unidirectional tapes 132 (FIG. 6), and/or woven fabric 134 (FIG. 16) of a laminated composite structure 100 in a manner to locally increase or decrease the fracture toughness, elastic modulus, and/or or strain-to-failure of the composite structure 100 in anticipation of predicted environmental and/or mechanical loading conditions to which the composite structure 100 may be subjected during its service life.

In another example, one or more modifier materials may be applied to a fiber form in a printed pattern 200 that functions as a corrosion barrier between a laminated composite structure and a metallic part. In this regard, the printed pattern 200 (FIG. 6) may act as a corrosion barrier against oxidative and/or a reduction reactions that may occur between a carbon fiber laminate and a metallic component such as an aluminum component. In a further example, one or more modifier materials may be printed onto a fiber formed to improve the flammability, smoke, and/or toxicity characteristics of a composite structure 100 (FIG. 2). Advantageously, in any of the examples disclosed herein, modifier materials may be printed onto a fiber form to locally tailor the properties of the composite laminate 104 (FIG. 2) in correspondence with the anticipated service environment and/or loading conditions. For example, modifier materials may be printed in a manner to alter the modulus of elasticity at different locations within the composite laminate 104 to accommodate the loading conditions of the composite laminate 104. In this regard, by printing of one or more different types, quantities, and geometric configurations of modifier materials on fiber tows, tapes, plies, and/or woven fabric in specific regions of a layup 102, the performance of a composite structure 100 may be tailored to the anticipated service conditions and operating environment of the composite structure 100.

FIG. 7 shows a portion of a length of a reinforcing filament 116 of a fiber tow 114 (FIG. 5) and illustrating a sizing 138 (e.g., a surface coating) that may be optionally included with the reinforcing filament 116. As indicated above, the sizing 138 may be applied during manufacturing of a reinforcing filament 116. The sizing 138 may protect the reinforcing filament 116 from damage such as breakage during manufacturing and/or during later processing such as during weaving and/or layup of composite plies 106.

FIG. 8 shows a cross section of a fiber tow 114 and/or unidirectional tape 132 formed of the plurality of reinforcing filaments 116 of a first material 120. Also shown is a printed pattern 200 of modifier material (e.g., a second material 202) printed onto an outer portion of the bundle 122 of reinforcing filaments 116. The modifier material is shown printed on a top surface 128 of the fiber tow 114 and/or unidirectional tape 132. As indicated above, the modifier material may be printed in a desired thickness 208. For example, modifier material may be printed in a thickness 208 of up to 100 microns or greater.

FIG. 9 shows a cross section of a fiber tow 114 and/or unidirectional tape 132 formed of a plurality or bundle 122 of reinforcing filaments 116. A modifier material (e.g., a second material 202) may be printed in a printed pattern 200 on at least two (2) different planes 124 associated with the bundle 122 of reinforcing filaments 116. For example, a printed pattern 200 may be applied to both a top surface 128 and a bottom surface 130 of the unidirectional tape 132. The modifier material may be printed in a distributed pattern and at a desired thickness 208 to enable ply bridging with composite plies 106 adjacent to the top surface 128 and bottom surface 130. In addition, a printed pattern may be applied to one or more sides of unidirectional tape (see e.g., FIG. 13).

FIG. 10 is a cross-sectional view of a composite layup 102 (FIG. 2) showing a printed pattern 200 bonding together the unidirectional tape 132 of adjacent composite plies 106 of a composite structure 100. The printed pattern 200 of modifier material may be applied to the reinforcing filaments 116 of one or both of the composite plies 106 at a depth that enables mechanical interlocking and/or chemical interaction of the composite plies 106. In FIG. 10, the printed pattern 200 of modifier material directly contacts and may provide improved tack with or may adhesively bond with both of the composite plies 106. Although the unidirectional plies 110 in FIG. 10 have the same fiber orientation, the modifier material may directly bond adjacent composite plies 106 having different fiber orientations. In one example, a printed pattern 200 may vary in length, width, and height to include any combination of geometric features (not shown) for mechanical interlocking of plies including, but not limited to, ball and sockets, hooks and loops, dovetail wedges and grooves, curved peaks and troughs, bionic interlocking features, irregular three-dimensional shapes, and any other type of geometric feature.

FIG. 11 is a cross-sectional view of a composite layup 102 (FIG. 2) including a pair of adjacent composite plies 106 of unidirectional tape 132. Modifier material may be printed onto each one of the composite plies 106. The modifier material of one composite ply 106 may be in contact with the modifier material of the adjacent composite ply 106. The modifier materials may be mechanically and/or chemically interlocked with one another. In any of the examples disclosed herein, the composition of modifier materials may be selected such that contact between the modifier materials result in an interface with miscible or immiscible interaction between the modifier materials.

Furthermore, any one or more modifier materials may be soluble, partially soluble, or insoluble in the resin 112 (FIG. 2). A soluble or partially soluble modifier material may be configured to release catalyst or hardener during curing of the resin to locally alter the cure properties (e.g., cure time and/or cure temperature) of the resin. In this regard, a modifier material may at least partially dissolve in the resin when the soluble material reaches a predetermined temperature causing the modifier material to progressively release catalyst or hardener into the resin, and thereby reduce the resin cure time relative to the cure time of resin lacking the modifier material. In addition, any one or more modifier materials may have a heat of reaction that is lower than the resin heat of reaction which may have the effect of locally reducing the cure temperature to thereby reduce local thermal distortion in the composite laminate as a result of differences in the coefficient of thermal expansion (CTE) of the resin relative to the CTE of the fibers 114. In a further example, any one or more modifier materials may be porous to locally increase the strain capability of the resin along at least one direction when the composite structure is subjected to an external load or force.

FIG. 12 is a cross-sectional view of a composite layup 102 (FIG. 2) wherein a modifier material may be printed on each one of the composite plies 106 to facilitate interlocking of the modifier material of each composite ply 106. The printed pattern 200 of modifier material on each one of the composite plies 106 may be printed with mechanical interlocking features 222. For example, the printed pattern 200 on one of the composite plies 106 may include teeth 224, hooks, or other mechanical features for physically engaging and interlocking with corresponding mechanical interlocking features 222 that may be printed on the modifier material of the opposing composite ply 106. In some examples, the modifier material of one composite ply 106 in FIG. 12 may be configured to chemically interlock with the modifier material of the adjacent composite ply 106.

Figure 13:
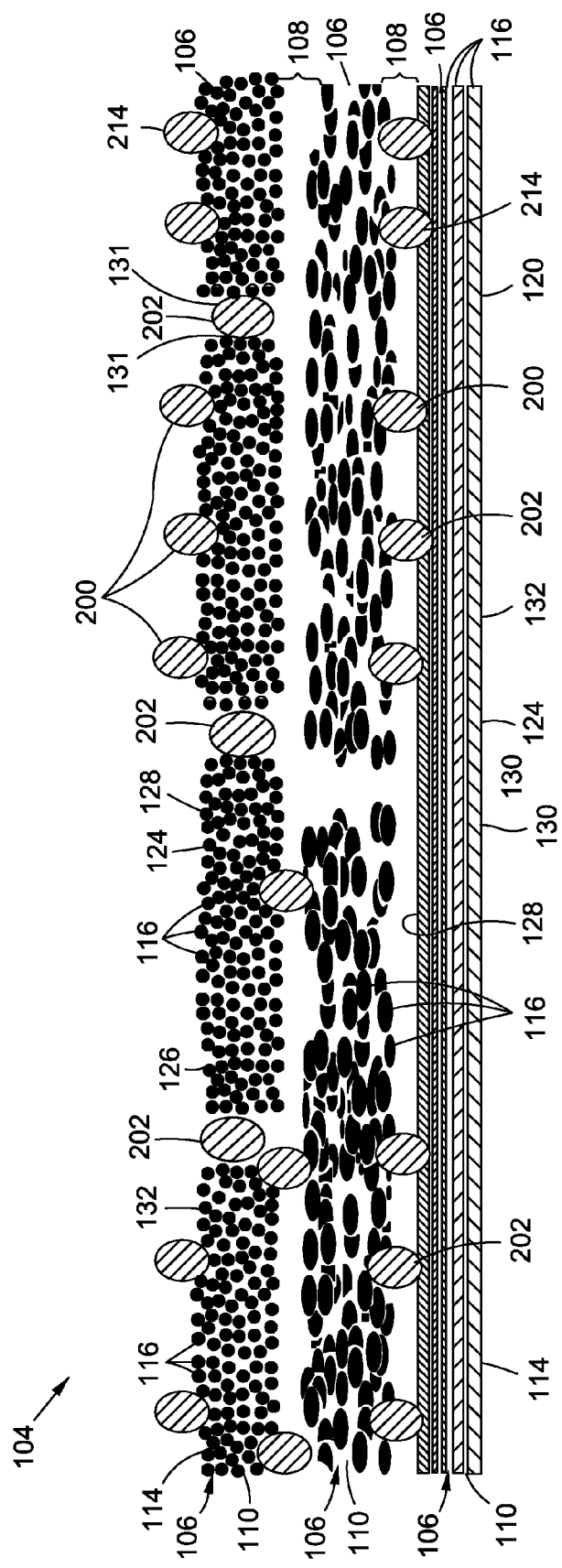
FIG. 13 is a cross-sectional view of a portion of a composite layup illustrating several adjacent composite plies of unidirectional tape having different fiber orientations and showing a second material directly contacting the adjacent composite plies and further showing a second material deposited between the sides of adjacent unidirectional tapes.

FIG. 13 is a cross-sectional view of a composite layup 102 (FIG. 2) showing several adjacent composite plies 106 of unidirectional tape 132 having different fiber orientations. Printed patterns 200 of modifier material may be printed on the composite plies 106 to facilitate or enable improved tack and/or ply bridging between the adjacent composite plies 106. A printed pattern 200 may also be applied between the side surfaces 131 of adjacent unidirectional tapes 132. In any one of the examples disclosed herein, modifier materials may be printed onto one or more fiber forms to provide any number of desired functionalities for the composite laminate 104. For example, modifier materials may be printed to improve the tack, electrical conductivity, corrosion resistance, interlaminar shear strength and fracture toughness, crack-arresting capability, thermal properties, and other functionalities. Advantageously, the ability to precisely control the material, size, geometry, and position of each printed pattern 200 with micro-scale accuracy in a repeatable manner may result in an improvement of the specific performance of composite laminates.

FIG. 14 is a schematic illustration of an example of a system for printing a printed pattern 200 of second material 202 onto a fiber tow 114 or unidirectional tape 132 or form. In the example shown, the system includes a bobbin 282 of fiber tow 114. The fiber tow 114 (FIG. 13) may be dry fiber or the fiber tow 114 may be pre-impregnated with resin 112 (FIG. 2). The fiber tow 114 may be fed via feed rollers 270 into a printer bed 256. The printer bed 256 may include a printer 260 having a deposition head 262 for printing modifier material in a printed pattern 200 onto the fiber tow 114. In some examples, the printer 260 may be movable along a guide track 258 along a left-to-right direction relative to the plane the paper as may be desirable for a pulse-printing operation wherein a length of the fiber tow 114 may be moved into the printer bed 256 and stopped to allow the printer 260 to apply the printed pattern 200 onto the length of fiber tow 114. The printer 260 may also be movable in a direction in and out of the plane of paper while the tow is stationary within the printer bed 256. In other examples, the printer 260 may be stationary and the fiber tow 114 may be continuously movable through the printer bed 256 while the printer 260 continuously prints the printed pattern 200 onto the fiber tow 114.

In FIG. 14, the printer 260 may operate in response to a computer-readable print program 254 instructions (e.g., code) based on a digital model 252 of the printed pattern 200. In some examples, the digital model 252 of the printed pattern 200 may be based on a computer-aided-design (CAD) model of the printed pattern 200 which may be generated on a computer 250 and which is shown displayed on the screen of the computer 250. The print program 254 may provide positional control of the deposition head 262 and may also control the size, shape, and general configuration of the printed pattern 200 that may be printed using print media 264 (e.g., the modifier material). In some examples, the printer bed 256 may include a display 274 for observation of the progress of printing the printed pattern 200 on a fiber tow 114 (FIG. 13). After printing the printed pattern on a fiber tow 114, the printed fiber tow 276 may be wound on a bobbin 282. Although not shown, the bobbin 282 of printed fiber tow 276 may be transported to a composite layup area wherein the fiber tow 114 may be laid up into a composite laminate 104 in a manually layup process and/or by using an automated tape laying machine (not shown).

Figure 14A:
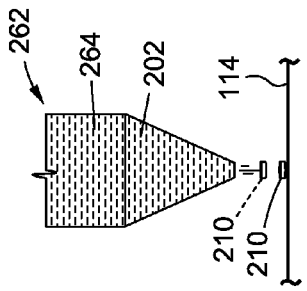
FIG. 14A is a schematic illustration of print media taken along line 14A of FIG. 14 and showing the print media made up of particulates.
Figure 14B:
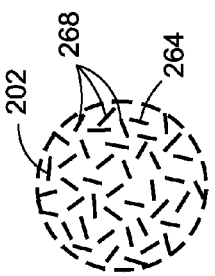
FIG. 14B is a schematic illustration of the print media made up of filament strands.
Figure 14C:
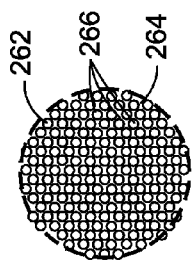
FIG. 14C is an enlarged view of a tip of the deposition head taken along line 14C of FIG. 14 and showing pixels being formed on a fiber tow.
Figure 14:
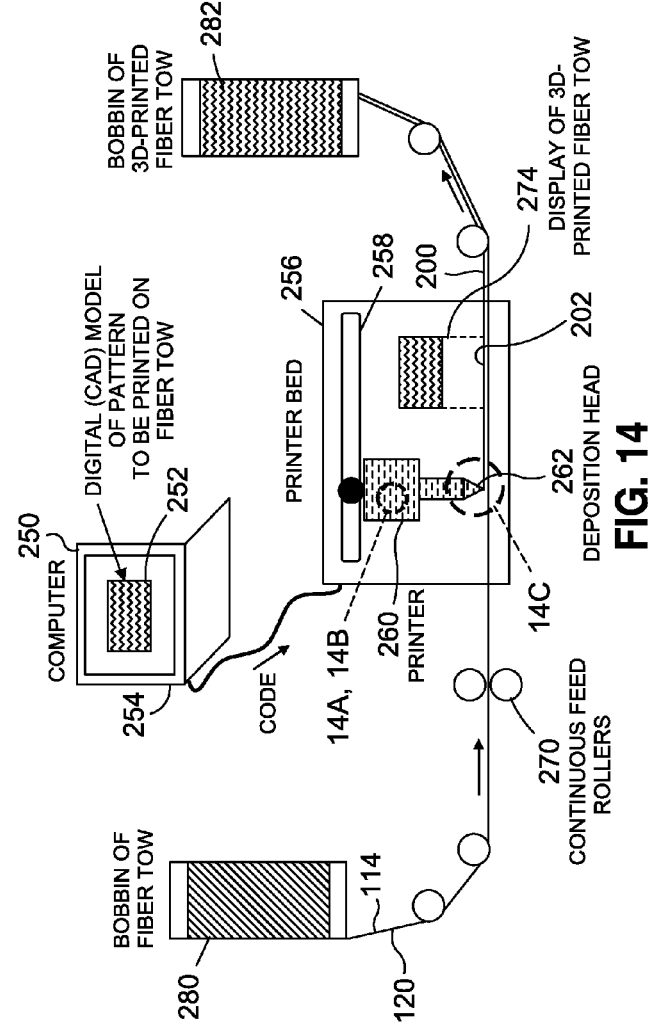
FIG. 14 is a schematic illustration of an example of a system for printing a printed pattern of second material onto a fiber tow.

FIG. 14A is a schematic illustration of an example of print media 264 made up of particulates 266. The particulates 266 may be provided in a generally spherical shape. However other shapes are contemplated. FIG. 14B is a schematic illustration of print media 264 made up of filament strands 268. As indicated above, the print media 264 (e.g., the modifier material) may include organic monomers, prepolymers, polymers metallic powders, inorganic fillers, and other modifier materials. FIG. 14C is an enlarged view of a tip of the deposition head 262 showing pixels 210 being formed on a fiber tow 114. As mentioned above, each pixel 210 may have a diameter of up to 100 microns or larger and may have a thickness 208 of at least approximately 0.1 microns. The deposition head 262 may print a succession of pixels 210 in order to build up a printed pattern 200 of desired thickness 208, length 204, width 206, and geometry.

Figure 15:
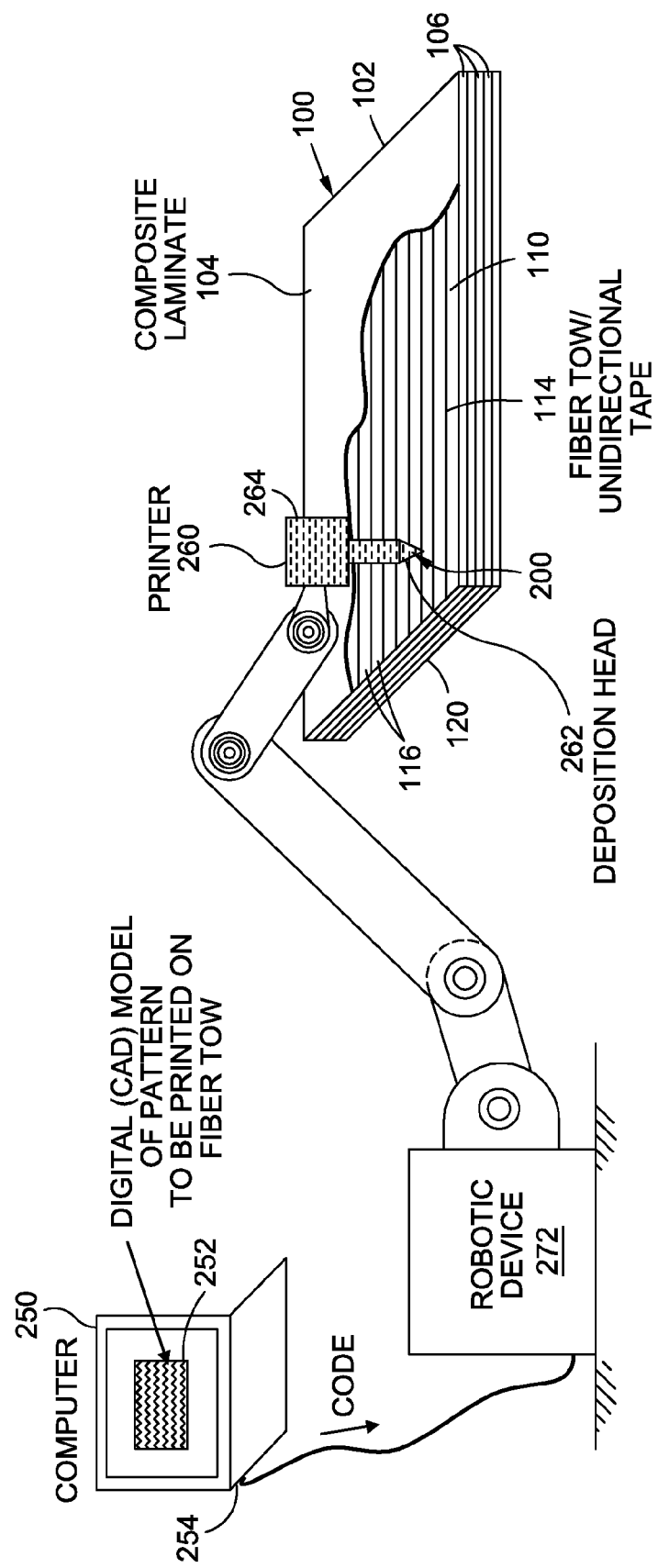
FIG. 15 is a schematic illustration of an example of a robotic device for automated printing of a printed pattern of second material onto a composite layup.

FIG. 15 is a schematic illustration of an example of a robotic device 272 for printing a printed pattern 200 of modifier material onto a fiber form. In the example shown, the robotic device 272 may include articulated arms for positioning the deposition head 262 of the printer 260 relative to a composite laminate 104 of unidirectional tape 132 (FIG. 13). The robotic device 272 may control the printer 260 to print a predetermined printed pattern 200 of modifier material on successive composite plies 106 in a stack of a composite laminate 104. The robotic device 272 may be operated in response to computer-readable print program 254 instructions (e.g., code) based on a digital model 252 of the printed pattern 200, similar to the arrangement described for the printer bed 256 of FIG. 14.

FIG. 16 is a schematic illustration of an example of a printer bed 256 for printing a printed pattern 200 of modifier material onto a woven fabric 134 or unidirectional tape 132 or sheet. In the example shown, the system includes a roll 284 of woven fabric 134 which may be dry fabric or prepreg fabric. The woven fabric 134 may be continuously fed via feed rollers 270 into a printer bed 256 having a printer 260 with a deposition head 262 for printing modifier material in a printed pattern 200 onto the woven fabric 134. The printer 260 may be stationary or the printer 260 may be movable in any one of a variety of different directions relative to the printer bed 256 similar to the above-described arrangement of FIG. 14. After printing the printed pattern 200 onto the woven fabric 134, the printed fiber tow 278 may be wound onto a roll 286.

The system of FIG. 16 may optionally be operated in a pulse mode arrangement wherein a section or length of the woven fabric 134 may be moved into the printer 260 head and the printer 260 may be moved while depositing a printed pattern 200 on the length of woven fabric 134, after which the printed woven fabric 278 may be wound on a roll 286. A new length of the woven fabric 134 may be fed into the printer bed 256 for printing. The fiber tow 114 printing system illustrated in FIG. 14 may also be operated in a pulse mode arrangement.

Figure 17:
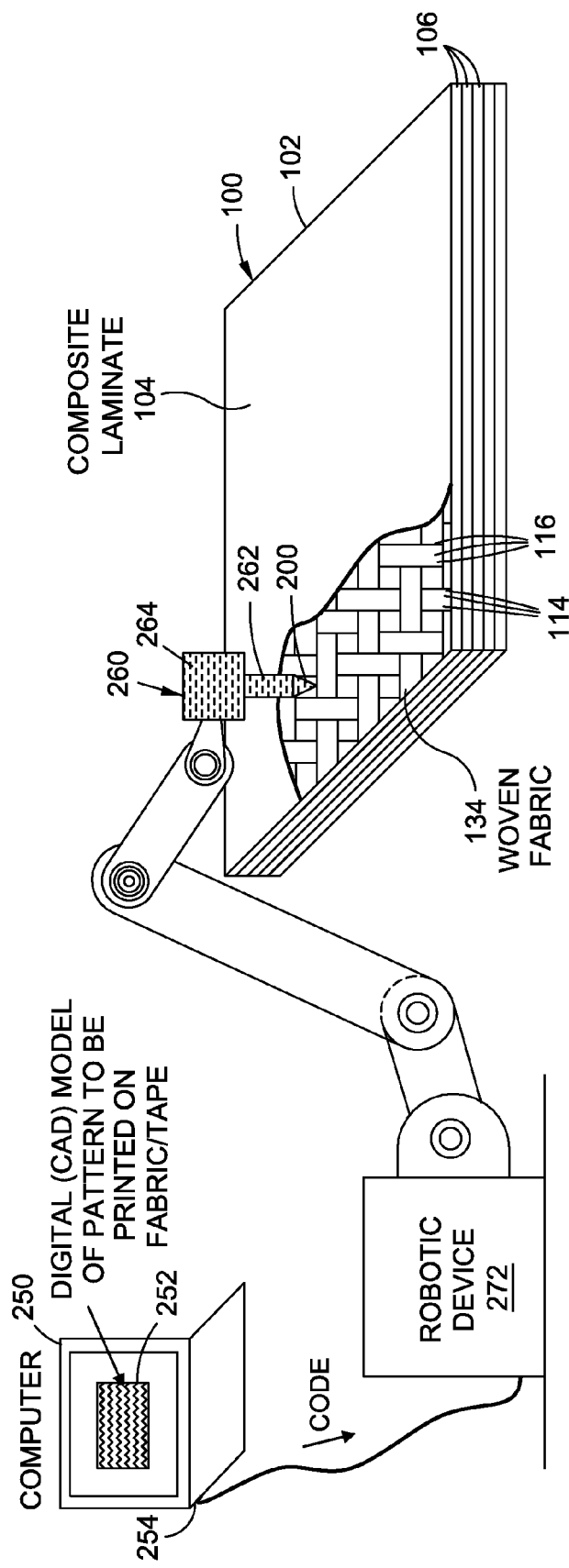
FIG. 17 is a schematic illustration of an example of a robotic device for automated printing of a printed pattern of second material onto a woven fabric, and/or unidirectional tape

FIG. 17 shows an example of a robotic device 272 for automated printing of a printed pattern 200 of modifier material onto a woven fabric 134 and/or unidirectional tape 132 (FIG. 16) or sheet. The robotic device 272 may be operated in a manner similar to that described above for FIG. 16. In this regard, the print program 254 may cause a robotic device 272 to position the printer 260 relative to the composite layup 102 while the deposition head 262 is controlled to print the predetermined printed pattern 200.

Figure 18:
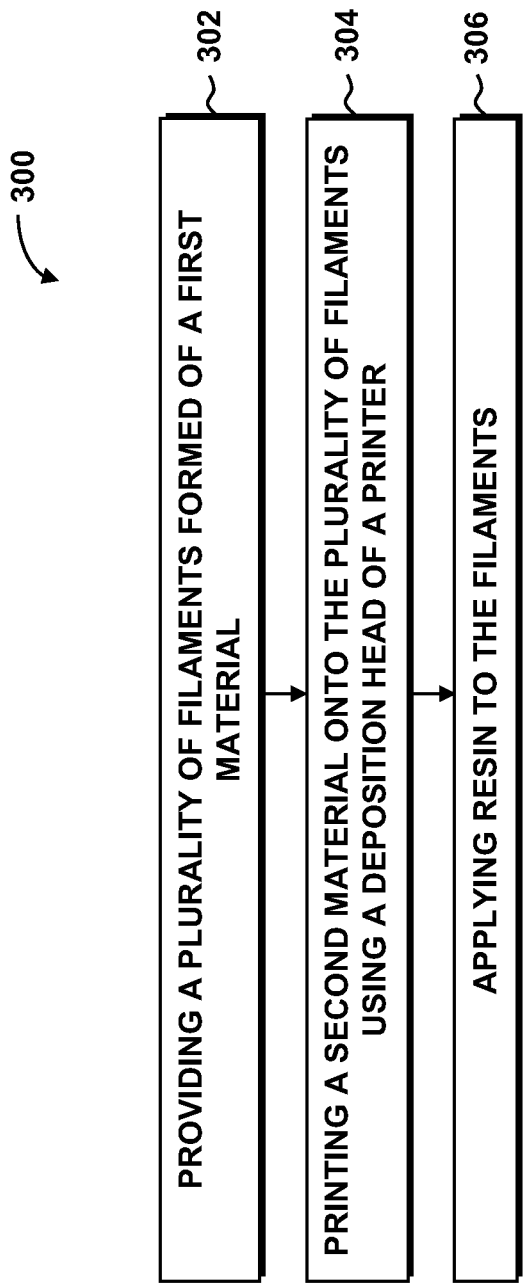
FIG. 18 is a flowchart illustrating one or more operations that may be included in a method of applying a printed pattern of second material onto a fiber tow, woven fabric, and/or unidirectional tape.

FIG. 18 is a flowchart illustrating one or more operations that may be included in a method 300 of applying a pattern of second material 202 (FIG. 4) onto a fiber tow 114 (FIG. 4), woven fabric 134 (FIG. 16), and/or unidirectional tape 132 (FIG. 4). Step 302 of the method 300 may include providing a plurality of reinforcing filaments 116 (FIG. 4) formed of a first material 120. As indicated above, the plurality of reinforcing filaments 116 may be provided as fiber tows, unidirectional tape, woven fabric, or other fiber forms.

Step 304 of the method 300 may include printing a second material 202 onto the plurality of reinforcing filaments 116 using a deposition head 262 of a printer 260. For example, FIGS. 14 and 16 illustrate a system including a printer 260 of a printer bed 256 for positioning the deposition head 262 relative to the fiber form. FIGS. 15 and 17 illustrate a robotic device 272 having articulated arms for positioning the deposition head 262 of a printer 260 relative to a composite laminate 104. In some examples, the deposition head 262 may be moved or positioned based on programmable code of a print program 254 that may be derived from a digital model 252 (computer-aided-design model) of a predetermined printed pattern 200 generator on a computer 250.

As may be appreciated, alternative systems may be implemented for printing a modifier material onto a fiber form. The printing of the modifier material may occur during fabrication of one or more forms a reinforcing filament 116 (FIG. 8) such as during fabrication of fiber tows 114 (FIG. 8), unidirectional tape 132 (FIG. 9), woven fabric 134, and/or fiber preforms 136. The printing of the modifier material may be performed by moving a printer deposition head 262 relative to a fiber preform 136 (FIG. 2) containing the plurality of reinforcing filaments 116 and/or by printing the second material 202 (FIG. 13) onto the fiber perform during layup of the fiber preform 136.

In some examples, the printed pattern 200 may be formed of a modifier material that has a length 204, a width 206, and/or a thickness 208 of approximately 0.01 to 500 microns. In some examples, the second material 202 may be printed in a predetermined printed pattern 200 on an outer portion 126 of the plurality of reinforcing filaments 116. For example, FIGS. 8-13 illustrate a printed pattern 200 deposited onto a top surface 128 and/or a bottom surface 130 of fiber tows 114, unidirectional tape 132. As indicated above, the modifier material (e.g., print media) may be provided in any one of a variety of different sizes, shapes, materials, and configurations, including, but not limited to, particulates 266 and/or filament strands 268 as respectively shown in FIGS. 14A and 14B.

In one example, the printing of the second material 202 (FIG. 1) may include the targeted placement of the second material 202 in resin-rich pockets (not shown) at divots and/or intersections of the fiber tows of woven fabric or between plies and/or tapes. In one embodiment, during the process of laying up composite plies of a woven fabric or prepreg, polymer nanoparticles (not shown) may be placed into the resin-rich pockets such as at the divots and/or intersections of the fiber tows of the woven fabric to prevent microcracking or stress cracking resulting from changes in temperature of the composite structure 100.

Figure 19:
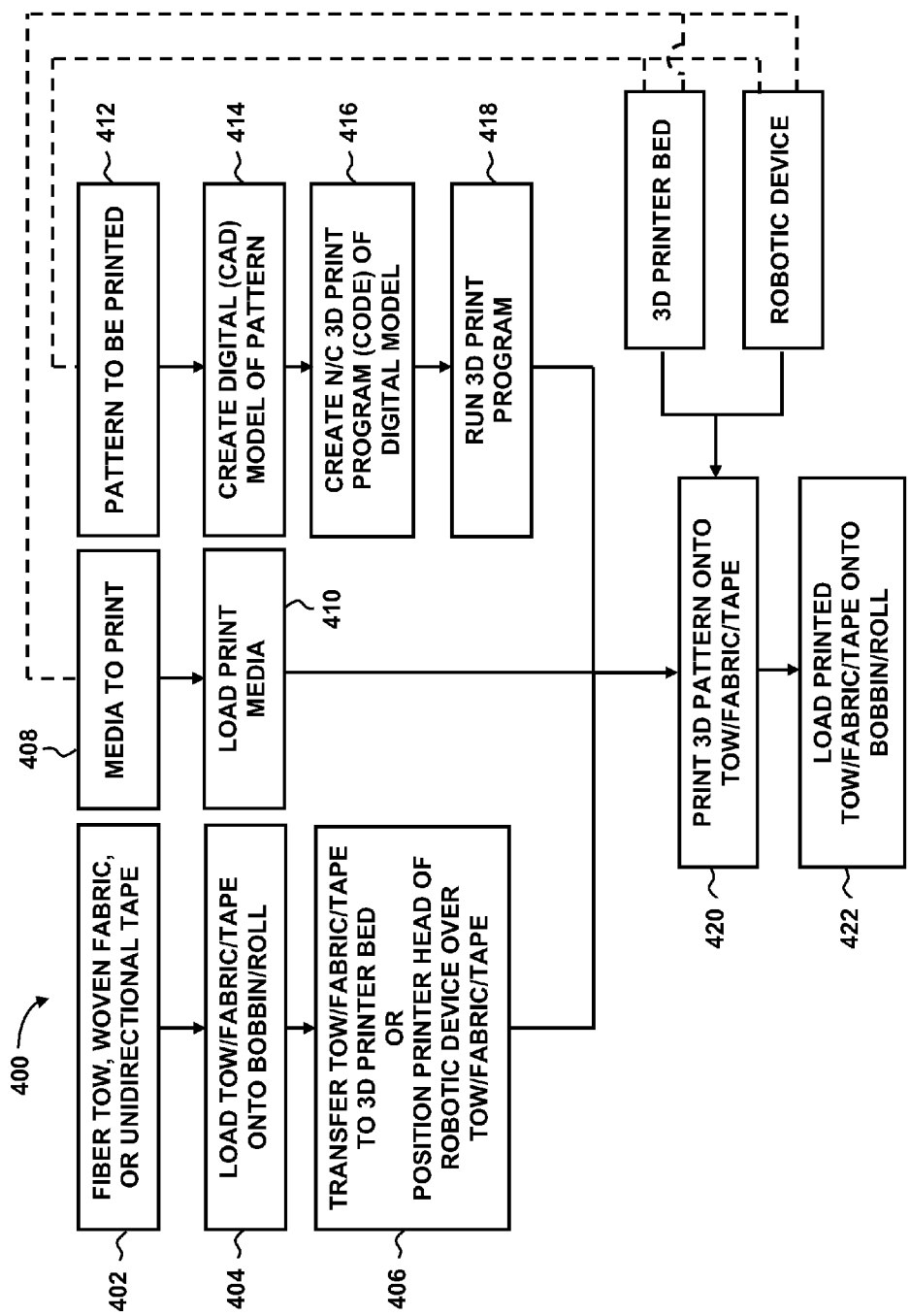
FIG. 19 is a flowchart illustrating one or more operations that may be included in a method of printing a printed pattern using a system shown in FIGS. 14-17.

FIG. 19 is a flowchart illustrating one or more operations that may be included in a method 400 of printing a printed pattern 200 onto a fiber form using one of the systems schematically illustrated in FIG. 14-17. Step 402 of the method may include providing the fiber form to be printed such as fiber tow 114, woven fabric 134, or unidirectional tape 132. Step 404 may include loading the fiber tow 114 onto a bobbin, or loading woven fabric 134 or unidirectional tape 132 on a roll. Step 406 may include transferring the fiber tow 114 or woven fabric 134 to a printer bed 256 as shown in FIGS. 14 and 16, or positioning a printer 260 of a robotic device 272 over the fiber tow 114, unidirectional tape 132, or woven fabric 134 as shown in FIGS. 15 and 17.

Step 408 of the method 400 may include providing print media 264 for printing onto the fiber tow 114, woven fabric 134, or unidirectional tape 132. Step 410 may include loading the print media 264 into a printer 260 as shown in FIGS. 14-17. Step 412 may include designing a printed pattern 200 to be printed onto a fiber form. For example, a computer 250 may be used to create a digital model 252 of a printed pattern 200. Step 416 may include creating a numerical control (N/C) three-dimensional print program 254 (e.g. code) based on the digital model 252. The print program 254 may include instructions regarding the length, width, height, and/or geometry with which the modifier material is to be printed onto the fiber form.

Step 418 may include running the print program 254 to operate a printer of a printer bed 256 (FIGS. 14 and 16) or a robotic device 272 (FIGS. 15 and 17). Step 420 may include printing the printed pattern 200 onto the fiber tow 114, woven fabric 134, or unidirectional tape 132. As indicated above, the fiber form may be passed through the fiber bed on a continuous basis or on a pulse basis while the deposition head 262 prints the printed pattern 200 onto the fiber form. Alternatively, the fiber form may be stationary as shown in FIGS. 15 and 17, and the robotic device 272 may move the deposition head 262 to print the printed pattern 200 onto a composite laminate 104. Step 422 may include loading the printed fiber tow/tape or printed woven fabric 134 onto a respective bobbin 282 or roll 286.

The method may include transporting the bobbin 282 or roll 286 to a layup area (not shown) and laying up the printed fiber form into a composite laminate 104. The printed fiber form may include prepreg fibers containing the printed pattern 200 (FIG. 14) and arranged in a stack. Heat may be applied to the stack to reduce the viscosity of the prepreg resin causing the resin of adjacent composite plies 106 (FIG. 13) to intermingle. The resin may be allowed to cure and/or harden into a solidified state after which the resin may be passively or actively cooled to form the composite structure 100. Alternatively, the printed fiber form may be dry fibers containing the printed pattern 200 and which may be arranged in a stack. Liquid resin may be infused into the stack and heat and/or pressure may be applied to consolidate and cure and/or harden into a solidified state after which the resin 112 (FIG. 2) may be passively or actively cooled to form the composite structure 100.

Figure 20:
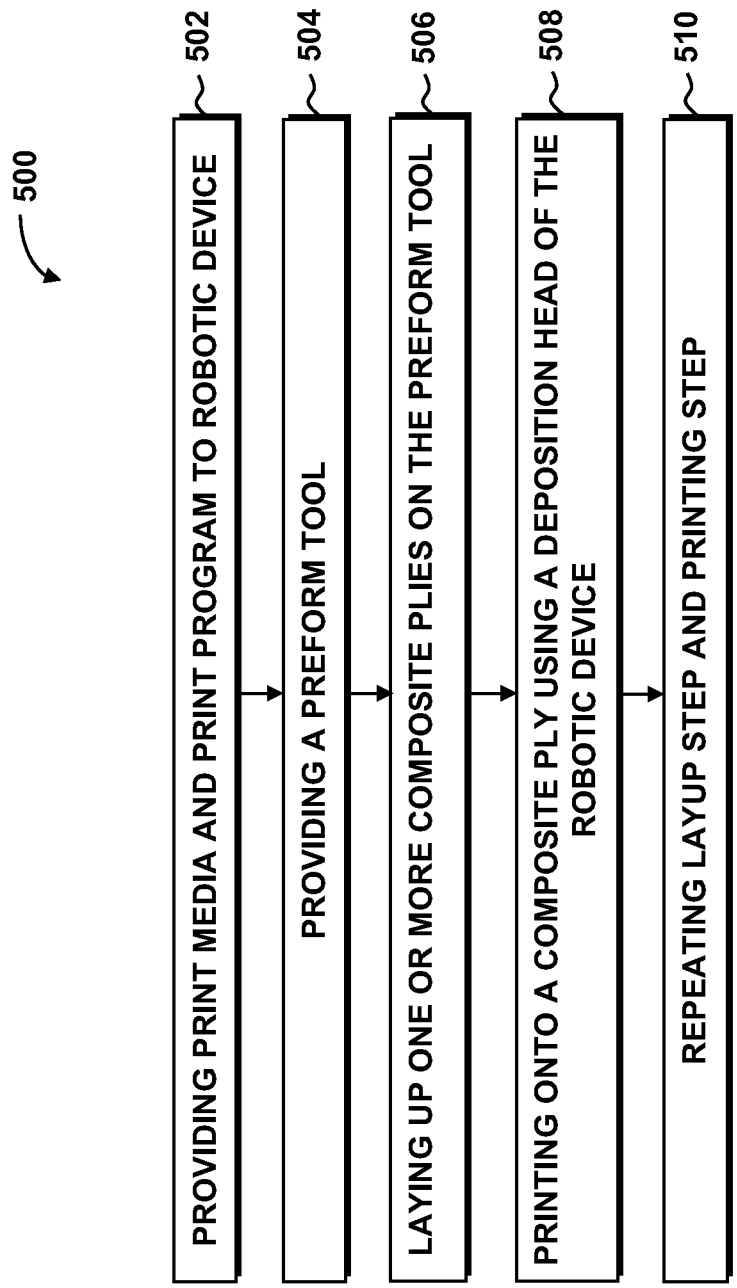
FIG. 20 is a flowchart illustrating one or more operations that may be included in a method of printing a printed pattern onto one or more composite plies during layup on a preform tool.

FIG. 20 is a flowchart illustrating one or more operations that may be included in a method 500 of printing one or more printed patterns 200 onto one or more composite plies 106 during layup on a preform tool (not shown). Step 502 of the method may include providing print media 264 and a print program 254 to one or more robotic devices 272 in a manner similar to that described with regard to FIG. 19. For example, the print media 264 may be loaded into the deposition head 262 of a robotic device 272 similar to the robotic device 272 shown in FIG. 17. A printed pattern 200 may be designed such as by using a computer aided design program to create a digital model 252 (FIG. 17) of the printed pattern 200 which may be transformed into a numerical control (N/C) three-dimensional print program 254 (e.g. code) and loaded into the robotic device 272.

Step 504 of the method 500 may include providing a preform tool (not shown) upon which one or more composite plies 106 may be laid up. For example, prepreg or dry fiber composite plies 106 may be precut to the approximate shape of a final composite structure 100 to be manufactured. One or more of the composite plies 106 may be laid up onto the preform tool during Step 506 of the method 500.

Step 508 of the method 500 may include activating the robotic device 272 to cause the deposition head 262 to print the printed pattern 200 onto the composite ply 106. As indicated above, the deposition head 262 may be configured to apply or print any number of different materials in any number of different patterns 200 onto any portion of a composite ply 106. For example, a second material may be printed onto the composite ply 106 to provide a specific functionality such as increased toughness for improved crack resistance in the final composite structure. A third material, fourth material, and any number of additional materials may be printed onto a composite ply 106 in any number of printed patterns 200 to provide specific functionalities such as improved interlaminar shear strength, increased electrical conductivity and corrosion resistance, improved tack in a broad range of temperatures, or any number of other functionalities, without limitation.

After completing the printing onto a composite ply 106, one or more additional composite plies 106 may be laid up over a previously-printed composite ply 106, and the deposition head 262 of the robotic device 272 may print another printed pattern 200 onto the newly-laid composite ply 106. Step 510 of the method may include repeating the layup Step 506 and the printing Step 508 until the desired number of composite plies 106 have been laid up and/or printed. Advantageously, the above-method allows for a high degree of precision and flexibility in applying printed patterns 200 to specific regions of a composite layup 102 using any number of different types of printed media or material (e.g., a second material, a third material, etc.).

Illustrative embodiments of the disclosure may be described in the context of a method (not shown) of manufacturing and/or servicing an aircraft, spacecraft, satellite, or other aerospace component. Pre-production, component manufacturing, and/or servicing may include specification and design of aerospace components and material procurement. During production, component and subassembly manufacturing, and system integration of aerospace components takes place. Thereafter, the aircraft, spacecraft, satellite, or other aerospace component may go through certification and delivery in order to be placed in service.

In one example, aerospace components produced by the manufacturing and servicing method may include an airframe with a plurality of systems and an interior. Examples of the plurality of systems may include one or more of a propulsion system, an electrical system, a hydraulic system, and an environmental system. Any number of other systems may be included. Although an aerospace example is shown, different illustrative embodiments may be applied to other industries, such as the automotive industry.

Apparatuses and methods embodied herein may be employed during at least one of the stages of an aerospace component manufacturing and/or servicing method. In particular, a composite structure 100 (e.g., FIG. 1), a coating, an injection-molded plastic, and/or an adhesive may be manufactured during any one of the stages of the aerospace component manufacturing and servicing method. For example, without limitation, a composite structure may be manufactured during at least one of component and subassembly manufacturing, system integration, routine maintenance and service, or some other stage of aircraft manufacturing and servicing. Still further, a composite structure may be used in one or more structures of aerospace components. For example, a composite structure may be included in a structure of an airframe, an interior, or some other part of an aircraft, spacecraft, satellite, or other aerospace component.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of producing a composite fiber comprising:
providing a dry fiber preform or a prepreg material each including a plurality of reinforcing filaments formed of a first material, the reinforcing filaments of the dry fiber preform being dry, the reinforcing filaments of the prepreg material being pre-impregnated with thermoplastic resin or thermosetting resin; and
printing a second material onto the dry fiber preform or the prepreg material using a deposition head of a printer.

2. The method of claim 1, wherein:
the second material has at least one of a length, a width, and a thickness of approximately 0.01 to 500 microns.

3. The method of claim 1, wherein the step of printing the second material comprises:
printing the second material in a predetermined printed pattern on an outer portion of the dry fiber preform or the prepreg material.

4. The method of claim 1, wherein:
the second material includes particles and/or filament strands.

5. The method of claim 1, wherein the step of printing the second material includes:
moving the deposition head relative to the dry fiber preform or the prepreg material based on a programmable code derived from a digital model (computer-aided-design model) of a predetermined printed pattern.

6. The method of claim 1, wherein the dry fiber preform or the prepreg material
is provided in at least one of the following fiber forms: a fiber tow, unidirectional tape, woven fabric, non-crimp fabric, a braid, a composite ply.

7. The method of claim 1, wherein the step of printing the second material includes:
moving the deposition head relative to the fiber preform containing the plurality of reinforcing filaments; and
printing the second material onto the fiber perform during layup of the fiber preform.

* * * * *